US011263030B2

(12) United States Patent
Li

(10) Patent No.: US 11,263,030 B2
(45) Date of Patent: Mar. 1, 2022

(54) DYNAMICALLY GUIDED DOCUMENT INTERACTION

(71) Applicants: Atlassian PTY Ltd., Sydney (AU); Atlassian, Inc., San Francisco, CA (US)

(72) Inventor: Shuai Li, Sunnyvale, CA (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 16/898,855

(22) Filed: Jun. 11, 2020

(65) Prior Publication Data

US 2021/0389962 A1 Dec. 16, 2021

(51) Int. Cl.

| | |
|---|---|
| ***G06F 9/451*** | (2018.01) |
| ***G06F 40/174*** | (2020.01) |
| ***G06F 40/106*** | (2020.01) |
| ***G06N 20/00*** | (2019.01) |

(52) U.S. Cl.

CPC ............ *G06F 9/453* (2018.02); *G06F 40/106* (2020.01); *G06F 40/174* (2020.01); *G06N 20/00* (2019.01)

(58) Field of Classification Search

None

See application file for complete search history.

(56) References Cited

U.S. PATENT DOCUMENTS

| | | | | |
|---|---|---|---|---|
| 9,285,948 | B2 * | 3/2016 | Duneau | G06F 3/0481 |
| 9,323,737 | B2 * | 4/2016 | Yang | G06F 40/186 |
| 9,449,524 | B2 * | 9/2016 | Bruce | G09B 7/00 |
| 9,588,879 | B2 * | 3/2017 | Horovitz | G06F 11/3438 |
| 9,772,986 | B2 * | 9/2017 | Zhang | G06F 40/174 |
| 10,606,618 | B2 * | 3/2020 | Lubow | G06F 3/0481 |
| 10,628,185 | B1 * | 4/2020 | Gupta | G06F 3/0481 |
| 10,789,461 | B1 * | 9/2020 | Agrawal | G16H 10/60 |
| 2003/0210513 | A1 * | 11/2003 | Yen | G06F 1/1677 361/679.06 |
| 2005/0183076 | A1 * | 8/2005 | Colangelo | G06F 9/453 717/147 |

(Continued)

OTHER PUBLICATIONS

Jira Cloud Platform Developer, *Atlassian Document Format*, pp. 1-5, [online], [retrieved from the Internet Jul. 2, 2020] <URL: https://developer.atlassian.com/cloud/jira/platform/apis/document/structure/>.

(Continued)

*Primary Examiner* — Stella Higgs
(74) *Attorney, Agent, or Firm* — Alston & Bird LLP

(57) ABSTRACT

Systems and methods provide techniques for dynamically guided document interaction. In one embodiments, a method includes identifying a guided interaction configuration object for a structured document template object; generating one or more guided interaction user interface objects; causing the limited-interaction device to sequentially present the one or more guided interaction user interface objects according to a guided interaction presentation order; subsequent to each sequential presentation, identifying the defined-format user input received by the guided interaction user interface object; and subsequent to sequential presentation of all of the one or more guided interaction user interface objects, causing the limited-interaction device to present a structured document user interface object.

24 Claims, 15 Drawing Sheets

(56) References Cited

U.S. PATENT DOCUMENTS

| | | | | |
|---|---|---|---|---|
| 2005/0257134 | A1* | 11/2005 | Goodman | G06F 40/174 715/226 |
| 2006/0053372 | A1* | 3/2006 | Adkins | G09B 7/02 715/709 |
| 2007/0122789 | A1* | 5/2007 | Yoo | G09B 19/0053 434/323 |
| 2009/0183066 | A1* | 7/2009 | Crawford | G06F 40/56 715/231 |
| 2010/0205530 | A1* | 8/2010 | Butin | G06F 9/453 715/715 |
| 2011/0004325 | A1* | 1/2011 | Ayal | G06F 1/3203 700/17 |
| 2011/0131491 | A1* | 6/2011 | Lu | G06F 9/453 715/708 |
| 2012/0310868 | A1* | 12/2012 | Martins | G06F 16/313 706/12 |
| 2013/0139042 | A1* | 5/2013 | Padala | G06Q 10/10 715/205 |
| 2014/0298162 | A1* | 10/2014 | Cohen | G06F 40/103 715/234 |
| 2015/0067645 | A1* | 3/2015 | Jhoney | G06F 8/73 717/123 |
| 2016/0147397 | A1* | 5/2016 | Castle | G09B 19/0053 715/765 |
| 2016/0299769 | A1* | 10/2016 | Hunter | H04W 12/08 |
| 2017/0300482 | A1* | 10/2017 | Gopalakrishnan | G06F 9/453 |
| 2018/0039907 | A1* | 2/2018 | Kraley | G06K 9/4628 |
| 2018/0090027 | A1* | 3/2018 | Lehrian | G06F 3/04883 |
| 2019/0095788 | A1* | 3/2019 | Yazdani | G06N 3/08 |
| 2020/0311601 | A1* | 10/2020 | Robinson | G06N 3/084 |
| 2021/0027141 | A1* | 1/2021 | MacAvaney | G06K 9/628 |
| 2021/0034858 | A1* | 2/2021 | Singh | G06N 20/00 |
| 2021/0073532 | A1* | 3/2021 | Torres | G06N 20/00 |

OTHER PUBLICATIONS

Jira Cloud Platform Developer, *Node—table*, pp. 1-3, [online], [retrieved from the Internet Jul. 2, 2020] <URL: https://developer.atiassian.com/cloud/jira/platform/apis/document/nodes/table/>.

Jira Cloud Platform Developer, *Node—tableCell*, pp. 1-3, [online], [retrieved from the Internet Jul. 2, 2020] <URL: https://developer.atlassian.com/cloud/jira/platform/apis/document/nodes/table_cell/>.

Jira Cloud Platform Developer, *Node—tableRow*, pp. 1-3, [online], [retrieved from the Internet Jul. 2, 2020] <URL: https://developer.atlassian.com/cloud/jira/platform/apis/document/nodes/table_row/>.

Jira Cloud Platform Developer, *Node—paragraph*, pp. 1-2, [online], [retrieved from the Internet Jul. 2, 2020] <URL: https://developer.atlassian.com/cloud/jira/platform/apis/document/nodes/paragraph/>.

Jira Cloud Platform Developer, *Node—heading*, pp. 1-2, [online], [retrieved from the Internet Jul. 2, 2020] <URL: https://developer.atlassian.com/cloud/jira/platform/apis/document/nodes/heading/>.

Altassian | Confluence Templates, *There's A Confluence Template for That*, pp. 1-5, [online], [retrieved from the Internet Jul. 2, 2020] <URL: https://www.atlassian.com/software/confluence/templates>.

* cited by examiner

500

511

{ "type: "heading", "attrs": { "level:" 1 }, "content: [ { "type": "text", "text": "Meeting List" } ] }

521

522

512

{ "type": "paragraph", "content": [ { "type": "text", "text": "Provided below is the meeting list for Employee" } ] }

513

{ "type": "table", "attrs": { "isNumberColumnEnabled": false, "layout": "default" }, "content": [ { "type": "tableRow", "content": [ { "type": "tableCell", "attrs": {}, "content": [ { "type": "paragraph", "content": [ { "type": "text", "text": "Meeting Name" } } ] }, { "type": "tableCell", "attrs": {}, "content": [ { "type": "paragraph", "content": [ { "type": "text", "text": "Meeting Time" } ] } ] }, { "type": "tableCell", "attrs": {}, "content": [ { "type": "paragraph", "content": [ { "type": "text", "text": "Meeting Address" } ] } ] } } ] }, [ { "type": "tableRow", "content": [ { "type": "tableCell", "attrs": {}, "content": [ { "type": "paragraph", "content": [ { "type": "text", "text": "Enter Meeting Name" } } ] }, { "type": "tableCell", "attrs": {}, "content": [ { "type": "paragraph", "content": [ { "type": "text", "text": "Enter Meeting Time" } ] } ] }, { "type": "tableCell", "attrs": {}, "content": [ { "type": "paragraph", "content": [ { "type": "text", "text": "Enter Meeting Address" } ] } ] } } ] } ] }

Meeting List 611

Provided below is the employee list for Employee 612

| Meeting Name 621 | Meeting Time 622 | Meeting Address 623 |
|---|---|---|

613

600

900

Meeting List 911

Provided below is the meeting list for Brian Yu 912

913

| Meeting Name | Meeting Time | Meeting Address |
|---|---|---|
| Sales Meeting 921 | December 12, 2013 922 | 220 ABC Street Atlanta GA 30033, Room 31B 923 |

FIG. 9

DYNAMICALLY GUIDED DOCUMENT INTERACTION

BACKGROUND

Various methods, apparatuses, and systems are configured to provide techniques for document interaction in document management systems. Applicant has identified many deficiencies and problems associated with existing methods, apparatuses, and systems for document interaction in document management systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable document interaction in document management systems. For example, certain embodiments of the present invention provide methods, apparatuses, systems, computing devices, and/or the like that are configured to enable document interaction in document management systems using guided interaction configuration objects for structured document template objects.

In accordance with one aspect, a computer-implemented method is provided. In one embodiment, the computer-implemented method comprises: identifying a guided interaction configuration object for a structured document template object, wherein the guided interaction configuration object defines a guided interaction user interface policy of one or more guided interaction user interface policies for each structured data field of one or more structured data fields; generating one or more guided interaction user interface objects, wherein each guided interaction user interface object of the one or more guided interaction user interface objects is associated with a corresponding structured data field of the one or more structured data fields, is generated based on the guided interaction user interface policy for the corresponding structured data field, and is configured to receive a defined-format user input; causing a limited-interaction device to sequentially present the one or more guided interaction user interface objects according to a guided interaction presentation order; subsequent to each sequential presentation of a guided interaction user interface object of the one or more guided interaction user interface objects, identifying the defined-format user input received by the guided interaction user interface object; and subsequent to sequential presentation of all of the one or more guided interaction user interface objects, generating a structured document user interface object by mapping each identified defined-format user input to the structured data field that is associated with the identified defined-format user input, and causing the limited-interaction device to present the structured document user interface object.

In accordance with another aspect, a computer program product is provided. The computer program product may comprise at least one computer-readable storage medium having computer-readable program code portions stored therein, the computer-readable program code portions comprising executable portions configured to: identify a guided interaction configuration object for a structured document template object, wherein the guided interaction configuration object defines a guided interaction user interface policy of one or more guided interaction user interface policies for each structured data field of one or more structured data fields; generate one or more guided interaction user interface objects, wherein each guided interaction user interface object of the one or more guided interaction user interface objects is associated with a corresponding structured data field of the one or more structured data fields, is generated based on the guided interaction user interface policy for the corresponding structured data field, and is configured to receive a defined-format user input; cause a limited-interaction device to sequentially present the one or more guided interaction user interface objects according to a guided interaction presentation order; subsequent to each sequential presentation of a guided interaction user interface object of the one or more guided interaction user interface objects, identify the defined-format user input received by the guided interaction user interface object; and subsequent to sequential presentation of all of the one or more guided interaction user interface objects, generate a structured document user interface object by mapping each identified defined-format user input to the structured data field that is associated with the identified defined-format user input, and cause the limited-interaction device to present the structured document user interface object.

In accordance with yet another aspect, an apparatus comprising at least one processor and at least one memory including computer program code is provided. In one embodiment, the at least one memory and the computer program code may be configured to, with the processor, cause the apparatus to: identify a guided interaction configuration object for a structured document template object, wherein the guided interaction configuration object defines a guided interaction user interface policy of one or more guided interaction user interface policies for each structured data field of one or more structured data fields; generate one or more guided interaction user interface objects, wherein each guided interaction user interface object of the one or more guided interaction user interface objects is associated with a corresponding structured data field of the one or more structured data fields, is generated based on the guided interaction user interface policy for the corresponding structured data field, and is configured to receive a defined-format user input; cause a limited-interaction device to sequentially present the one or more guided interaction user interface objects according to a guided interaction presentation order; subsequent to each sequential presentation of a guided interaction user interface object of the one or more guided interaction user interface objects, identify the defined-format user input received by the guided interaction user interface object; and subsequent to sequential presentation of all of the one or more guided interaction user interface objects, generate a structured document user interface object by mapping each identified defined-format user input to the structured data field that is associated with the identified defined-format user input, and cause the limited-interaction device to present the structured document user interface object.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 5 provides an operational example of a structured document template object in accordance with at least some embodiments of the present invention.

Figure 6:
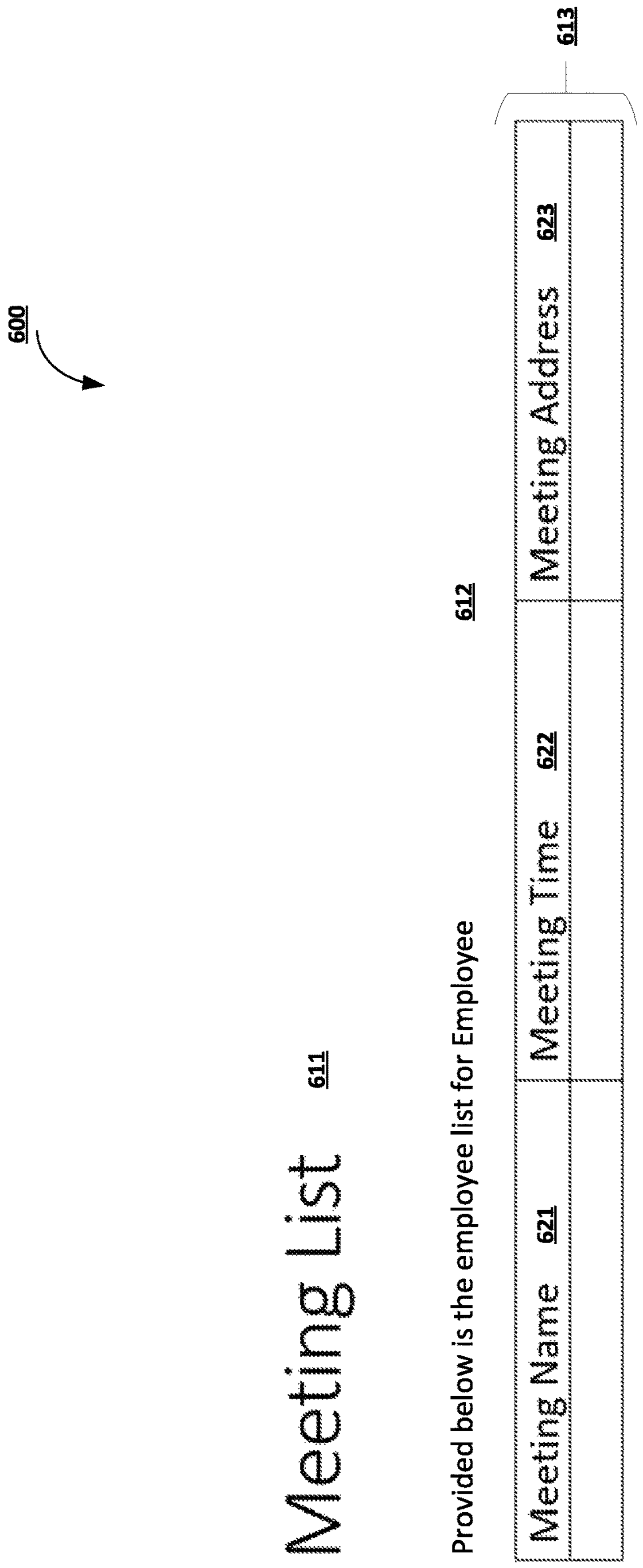

FIG. 6 provides an operational example of a structured document user interface generated prior to entry of user input in accordance with at least some embodiments of the present invention.

Figure 7:
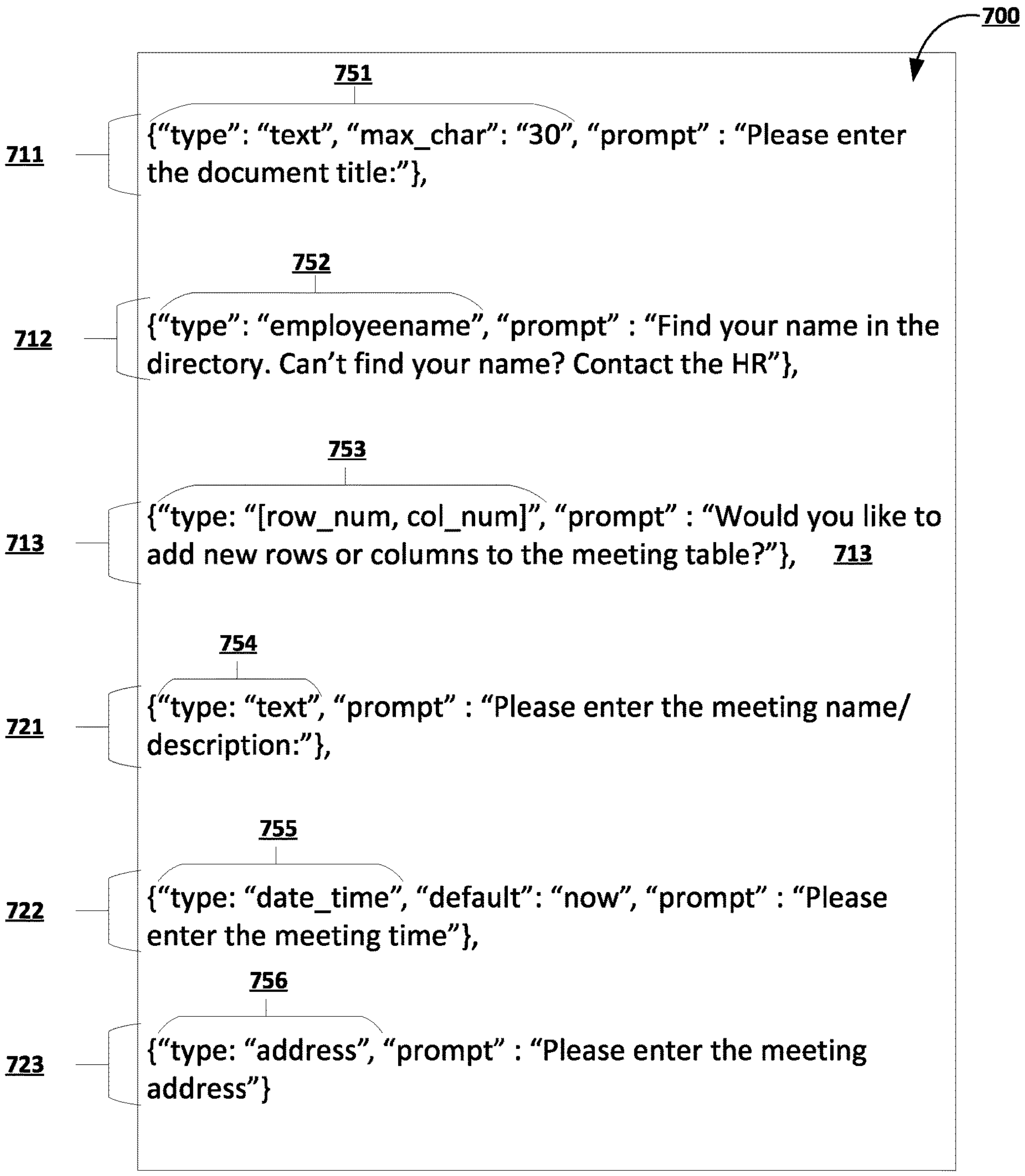

FIG. 7 provides an operational example of a guided interaction configuration object in accordance with at least some embodiments of the present invention.

FIGS. 8A-8F provide operational examples of various guided interaction user interfaces in accordance with at least some embodiments of the present invention.

FIG. 9 provides an operational example of a structured document user interface generated subsequent to entry of user input in accordance with at least some embodiments of the present invention.

Figure 10:
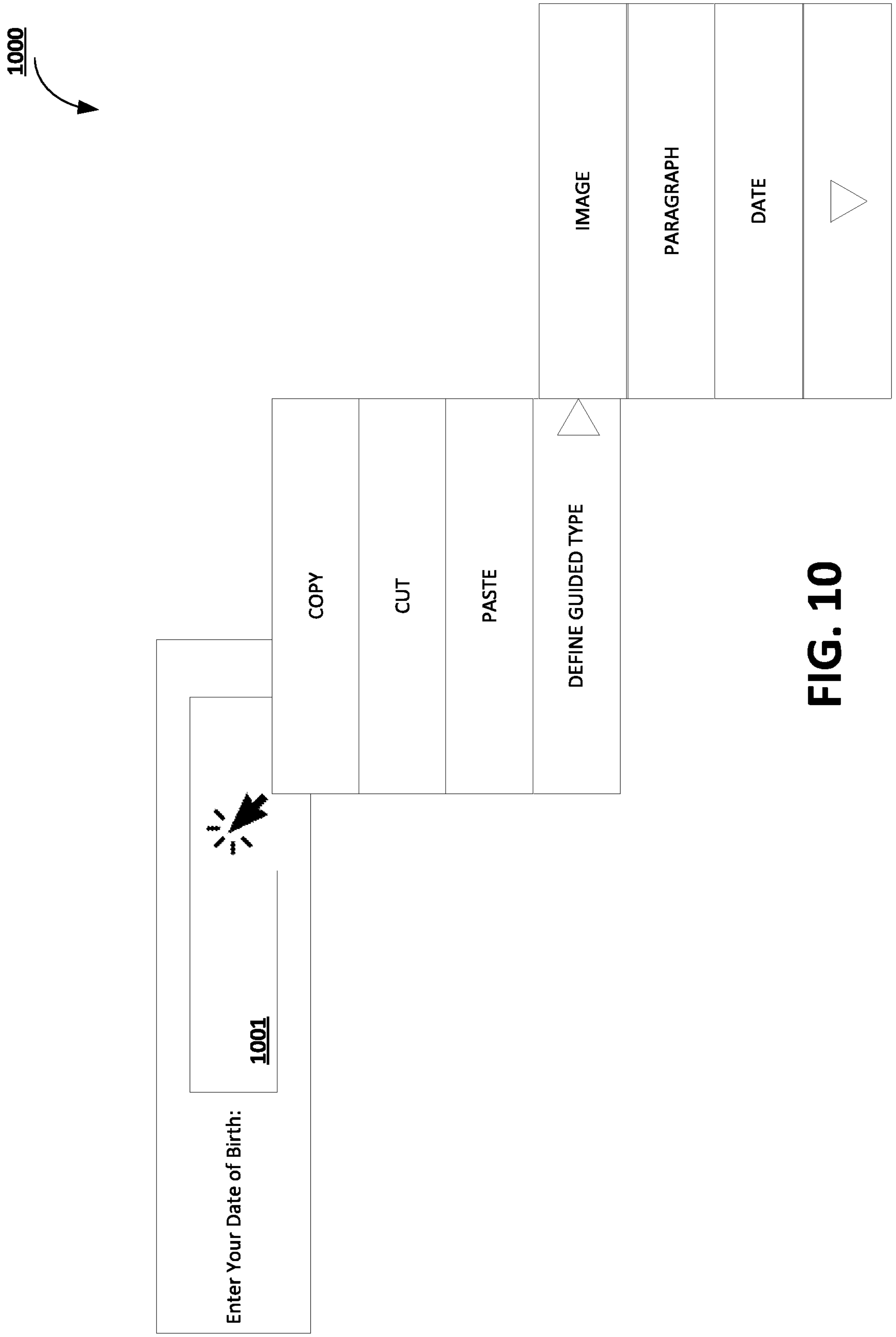

FIG. 10 provides an operational example of a document administration user interface in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Some example collaborative document management systems are configured to store document data as structured documents. For example, Confluence® by Atlassian PTY LTD stores document data using a combination of hierarchical nodes as defined by the Atlassian Document Format (ADF), where each hierarchical node defines the position of its associated content within a hierarchy of data types included in a corresponding document. Storing document data as structured data, as opposed to unstructured document data, has multiple advantages when it comes to retrieval and indexing of the document data. However, structured documents typically have a complex format with a variety of document elements each with their own interaction parameters, which in turn complicates effective user interaction with the noted document elements when human-computer interaction capabilities of a user system are limited.

For example, a structured document that is designed primarily for user interaction via a personal computing device may be very difficult to interact with if the noted interaction is performed by a user via a touch-based smartphone device or a wearable with limited user input devices and/or limited display space. User input limitations associated with structured documents in a collaborative document management system can also present considerable efficiency and reliability challenges. For example, as the likelihood of erroneous user interaction goes up, the need for costly "undo" and/or "re-do" operations also goes up.

In another example, user input limitations associated with structured documents may render important features of the collaborative document management system as effectively useless. If, for example, a user may not effectively engage or access particular icons, drop down menus, or data fields of a structured document in a collaborative document management system, then the functionalities associated with the noted icons, menus, and data fields will be effectively out of reach of the particular user.

To address the above noted shortcomings, various embodiments of the present invention are directed to systems that utilize the structured format of structured documents to enable guided interaction with those structured formats on limited interaction devices. For example, various embodiments of the present invention maintain guided interaction configuration objects that map structured document objects to guided interaction user interface policies, where the guided interaction user interface policies can in turn be configured to generate guided interaction user interfaces that are sequentially presented to enable end-user interaction with particular structured data fields on a per-field level, rather than on a per-document level. This in turn increases the likelihood that various functionalities provided by structured document objects can be utilized by end users that utilize limited interaction device, which in turn increases the efficiency and reliability of document management systems. Furthermore, by expanding accessibility of document management systems on limited interaction devices, various embodiments of the present invention increase the portability and versatility of document management systems and make important technical contributions to the field of multi-platform document management.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client accesses the service by way of a network. Client devices may include, without limitation, smart phones, tablet computers, laptop computers, wearables, personal computers, enterprise computers, and the like.

The term "structured document template object" refers to a data object that describes a collection of content data items as a group of structured data fields each associated with a per-field structured type. Structured document template objects are generated by a document management server, stored in a document repository maintained by the document management server, and transmitted to a client device in response to a request by the client device to access the collection of content data items associated with the data object by the client device. For example, a structured document template object may describe that a particular document object is associated with a heading-type structured data field, a paragraph-type structured data field, a group of table-cell-type structured data fields forming a table, and/or the like. In some embodiments, the structured document template object defines a per-document structured format for the document that is associated with the structured document template object. An example of a structured document template object is an ADF document. In some embodiments, a structured document template object is a structured format file, such as a JavaScript Object Notation (JSON) file or an Extensible Markup Language (XML) file.

The term "structured data field" refers to one or more content data items defined by a structured document template object, where each of the one or more content data items is associated with a common per-field structured type. Structured data fields are defined by a document management server, stored in a document repository for the document management server as part of a structured document template object, and transmitted to a client device in response to a request by the client device to access the content data associated with the structured document template object. Examples of structured data fields include heading-type structured data fields, paragraph-type structured data fields, table-cell-type structured data fields, list-item structured data fields, and/or the like. In some embodiments, a group of structured data fields within a structured document template object may be defined by a "per-document structured format". One example per-document structured format is a hierarchical per-document structured format that defines hierarchies of structured nodes that are embodied by various structured data fields (e.g., a defined hierarchy according to which a table cell node is a child of a table row node, which in turn is a child of a table node). In some of the noted embodiments where the per-document structured format defined by the structured document template object is a hierarchical per-document structured format, at least some of the structured data fields correspond to portions of the content data that are associated with the lowest hierarchical levels defined by the hierarchical per-document structured format (e.g., table cells but not table rows and tables).

The term "per-field structured type" refers to a data entity and associated instructions that define a configuration, arrangement, pattern, scheme, display form, or property of a structured data field. In some embodiments, the per-field structured type defines a mode of visual presentation and/or content type for content data associated with a structured data field. Per-field structured types are defined by a document management server, stored in a document repository for the document management server as part of the structured document template object, and transmitted to a client device in response to a request by the client device to access the content data associated with the structured document template object. For example, a per-field structured type for a corresponding structured data field may describe that the corresponding structured data field is a paragraph, a list item, a table cell, a heading, and/or the like. As another example, a per-field structured type for a corresponding structured data field may describe that the corresponding structured data field is configured to receive an alphanumeric value, a numeric value, a date value, a time value, a date-time value, a phone number value, an email address value, a physical address value, and/or the like.

The term "limited interaction device" refers to a computing device that is designed primarily for user interaction by a touchscreen (rather than with an accessory keyboard, trackball, trackpad, mouse, or the like). The term "non-limited interaction device" refers to a computing device that is designed primarily for user interaction by means other than touchscreen (means such as an accessory tactile keyboard, trackball, trackpad, mouse, or the like). Examples of limited interaction devices include smartphones, smartwatches, wearables, and tablets, while examples of non-limited interaction devices include desktop personal computers and laptop personal computers.

Depending on the accessory configuration, a limited interaction device may be converted to operate as a non-limited interaction device. For example, a tablet (i.e., generally a limited interaction device) may be configured to operate with a wireless mouse and wireless tactile keyboard thereby converting the tablet, for purposes of the invention described herein, to a non-limited interaction device. While many limited interaction devices provide virtual keyboards (i.e., non-tactile keyboards) as part of their touchscreen interfaces such virtual keyboards do not, in and of themselves, convert a limited interaction device to a non-limited interaction device.

In some embodiments, a document management server may infer whether a client device is a limited interaction device or a non-limited interaction device based on whether the client device seeks to access resources associated with a Uniform Resource Locator (URL) configured to be accessed by limited interaction devices or resources associated with URL configured to be accessed by a non-limited interaction device.

In still other embodiments, a computing device may be configured to transition between a limited interaction device mode and a non-limited interaction device mode without requiring additional accessories (e.g., additional tactile keyboards or wireless mice). For example, many laptops offer a "tablet mode" that is activatable by removing a tactile keyboard or folding the laptop into a tablet form factor. When configured in such a tablet mode, laptops of this type are designed primarily for user interaction by touchscreen and thus are considered in a limited interaction mode (i.e., are configured as limited interaction devices). However, when not configured in tablet mode, laptops of this type are designed primarily for user interaction by tactile keyboard and/or mouse and thus are considered in a non-limited interaction mode (i.e., are configured as non-limited interaction devices).

The term "guided interaction configuration object" refers to a data object and associated instructions that define, for each structured data field of a corresponding structured document template object, a guided interaction user interface policy (defined below). Guided interaction configuration objects are generated by a document management server, stored in a document repository maintained by the document management server, and transmitted to a client device in response to a request by the client device to access the corresponding structured document template object using a limited interaction device. The guided interaction configuration object may be a structured format file (e.g., a JSON file, an XML file, and/or the like) that is defined based on default guided interaction user interface policies, user-defined guided interaction user interface policies, predictively inferred guided interaction user interface policies, and/or the like. In some embodiments, a guided interaction configuration object may define a common guided interaction user interface policy for a group of structured data fields. For example, a guided interaction configuration object may define a common guided interaction user interface policy for each table-cell-type structured data field that is associated with a common table column of a particular table in the document corresponding to the guided interaction configuration object.

The term "guided interaction user interface policy" refers to a data entity and associated instructions associated with a guided interaction configuration object that describe and define an input mode and/or input interface for a corresponding structured data field of a structured document template object. For example, a guided interaction user interface policy defines presentation parameters of a guided interaction user interface (defined below) that is configured to enable a user to enter defined-format user input (defined below) into a structured data field. A guided interaction user interface policy is generated by a document management server for a corresponding structured data field of a structured document template object. In one example, a particular guided interaction user interface policy may define an alphanumeric character interface as the guided interaction user interface that is displayed to a limited interaction device for enabling user input associated with a particular structured data field. In another example, a particular guided interaction user interface policy may define a numeric character interface as the guided interaction user interface that is displayed to a limited interaction device for enabling user input associated with a particular structured data field. In still other embodiments, a particular guided interaction user interface policy may define a data entry interface as the guided interaction user interface that is displayed to a limited interaction device for enabling user input associated with a particular structured data field. Other guided interaction user interfaces that are configured to enable entry of an alphanumeric value, a numeric value, a date value, a time value, a date-time value, a phone number value, an email address value, a physical address value, and/or the like, may be defined by guided interaction user interface policies as discussed herein. In some embodiments, a guided interaction user interface policy may further describe a user interface size, a user interface display time, a user interface color, user interface accessibility settings, and/or the like of a guided interaction user interface object. In some embodiments, a guided interaction user interface policy defines a guided interaction type (defined below) for any structured data fields that are deemed to be associated with the guided interaction user interface policy.

The term "guided interaction type" refers to a data entity and associated instructions in a guided interaction configuration object that describe a user input content form, type, arrangement, and/or configuration that is expected to be received via the guided interaction user interface object (defined below) based on the guided interaction user interface policy. The guided interaction type is generated, maintained, and transmitted by a document management server as part of the guided interaction configuration object to which it belongs. For example, a guided interaction type may be an alphanumeric value, a numeric value, a date value, a time value, a date-time value, a phone number value, an email address value, a physical address value, and/or the like, as received by a guided interaction user interface in accordance with a guided interaction user interface policy. Accordingly, examples of guided interaction types include generic alphanumeric formats, generic numeric formats, date formats, time formats, generic time-date formats, phone number formats, email address formats, physical address formats.

The term "guided interaction user interface" refers to a graphical user interface component that is rendered by a limited interaction device for enabling user entry of a defined-format user input (defined below). A guided interaction user interface is rendered by a limited interaction device to a touchscreen display based on a guided interaction user interface object (defined below) received from a document management server.

The term "guided interaction user interface object" refers to a data object and associated instructions that describe the guided user interface that is to be generated by a limited interaction device for a corresponding structured data field of a structured document template object in accordance with the guided interaction user interface policy. A guided interaction user interface object is generated by a document management server and transmitted to a limited interaction device in response to a request by the limited interaction device to access the structured document template object. For example, a guided interaction user interface object may describe Hyper-Text Transfer Protocol (HTML) data associated with an alphanumeric interface (e.g., a guided interaction user interface) that is generated by a limited interaction device for a corresponding structured data field of a structured document template object in accordance with a corresponding guided interaction user interface policy. The guided interaction user interface object may be configured to be transmitted to a limited-interaction device in order to be enable rendering of the corresponding guided interaction user interface that is associated with the guided interaction user interface object by the limited-interaction device.

The term "guided interaction presentation order" refers to a data entity and associated instructions that describe a designated order of successive presentation of guided interaction user interfaces that are generated for structured data fields defined by a structured template document object. The guided interaction presentation order is generated by a document management server and transmitted to a limited interaction device in response to a request by the limited interaction device to access the structured document template object.

For example, given a structured template data object that is associated with structured data fields SDF1-SDF4, the guided interaction presentation order for the noted structured data fields may require that the following operations be performed: (i) first, the guided interaction user interface for the structured data field SDF2 is displayed based on a first guided interaction user interface object; (ii) after the end-user indicates a desire to transition from the guided interaction user interface for the structured data field SDF2, the guided interaction user interface for the structured data field SDF3 is displayed based on a second guided interaction user interface object; (iii) after the end-user indicates a desire to transition from the guided interaction user interface for the structured data field SDF3, the guided interaction user interface for the structured data field SDF1 is displayed based on a third guided interaction user interface object; and (iv) after the end-user indicates a desire to transition from the guided interaction user interface for the structured data field SDF1, the guided interaction user interface for the structured data field SDF4 is displayed based on a fourth guided interaction user interface object. In some embodiments, the structured document template object defines a layout format for the one or more structured data fields, and the guided interaction presentation order is determined based on the layout format.

The term "defined-format user input" refers to a data entity that describes a collection of user-entered data that is received via end-user interaction with a guided interaction user interface that is rendered based on a guided interaction user interface object. In some embodiments, at least one aspect of such user-entered data is defined based on the guided interaction type that is associated with the corresponding guided interaction user interface object. Examples of defined-format user inputs include a collection of user-entered data that is expected to describe an alphanumeric value, a collection of user-entered data that is expected to describe a numeric value, a collection of user-entered data that is expected to describe a date value, a collection of user-entered data that is expected to describe a time value, a collection of user-entered data that is expected to describe a date-time value, a collection of user-entered data that is expected to describe a phone number value, a collection of user-entered data that is expected to describe an email address value, a collection of user-entered data that is expected to describe a physical address value, and/or the like.

The term "structured document user interface object" refers to a data object and associated instructions that enables rendering, by a limited interaction device, of a structured document user interface (defined below). Structured document user interface objects are discussed herein include defined-format user inputs associated with one or more structured data fields. For example, a structured document user interface object may describe HTML data associated with a particular structured document whose per-document structured format is defined by the corresponding structured document user interface. The structured document user interface object is generated by the document management server and transmitted to an end-user computing device (which may be a limited-interaction device) in order to be enable rendering of the corresponding structured document user interface. In some embodiments, the structured document user interface object for a corresponding structured document template object may be generated by integrating defined-format user inputs generated in response to guided interaction user interface objects that are associated with the structured data fields of the corresponding structured document template object into the corresponding structured document template object.

The term "structured document user interface" refers to a user interface that is configured to display content data items associated with a structured document template object in accordance with the per-field structured types associated with the structured data fields of the structured document template object. A structured document user interface is configured to be displayed by a client device based on a structured document user interface object transmitted to the client by a document management server. The content data items displayed by a structured document user interface are determined based at least in part on defined-format user inputs associated with one or more structured data fields associated with a structured document template object.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
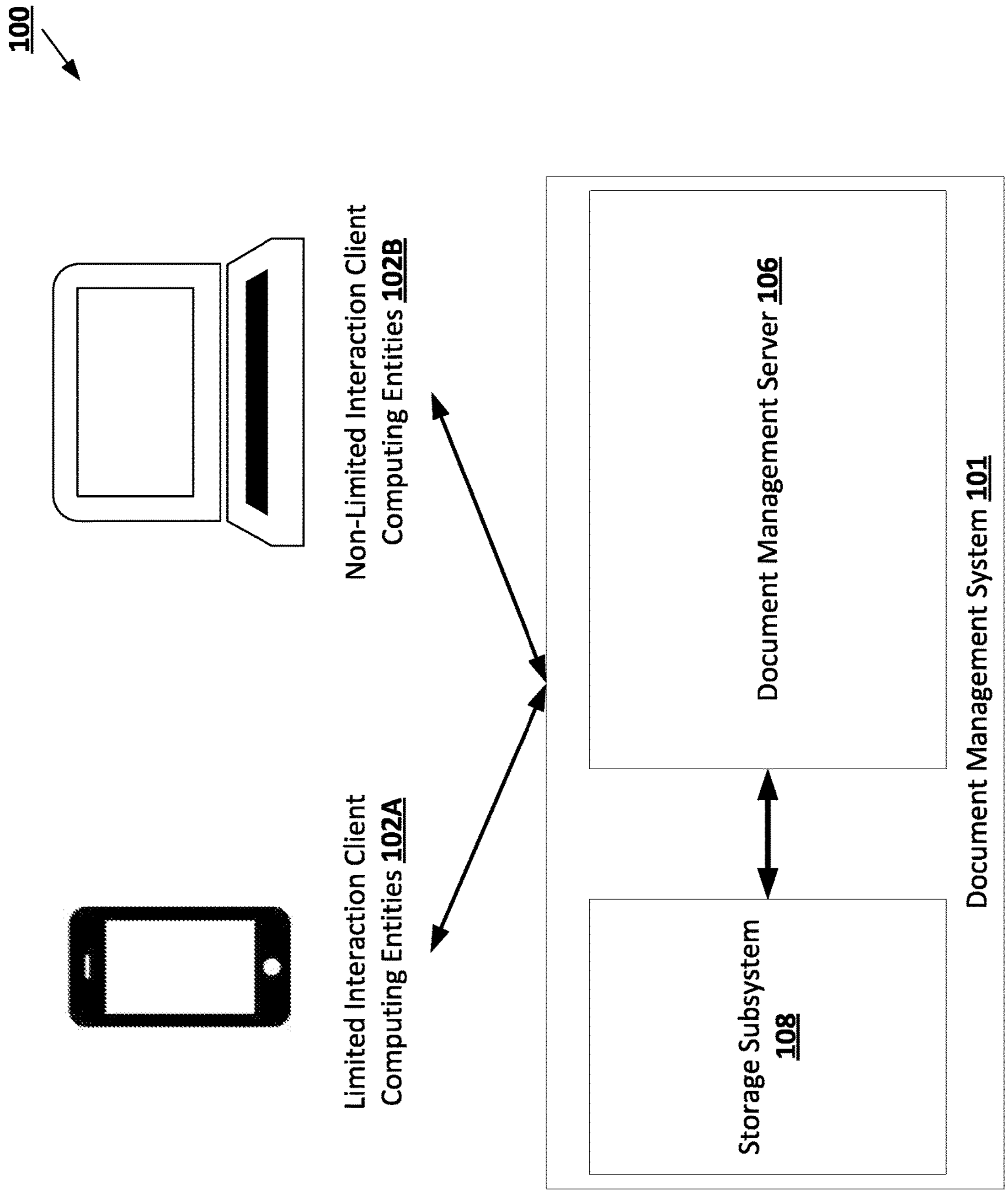
FIG. 1 is a block diagram of an example architecture within which at least some embodiments of the present invention may operate.

FIG. 1 illustrates an example architecture 100 within which embodiments of the present invention may operate. The architecture 100 includes a document management system 105 configured to interact with client devices, including one or more limited interaction client devices 102A and one or more non-limited interaction client devices 102B. The document management system 105 may be configured to receive document interaction requests from the client devices, process the document interaction requests to generate user interfaces that include data associated with requested documents, and provide rendering data associated with the user interfaces to the client devices. The document management system 105 may be configured to detect current spatial-temporal states of client devices and provide data associated with document objects deemed relevant to the current spatial-temporal states of client devices to those client devices.

The limited interaction client devices 102A may include client devices that fail to enable benchmark user interaction functionalities (e.g., the ability to click on buttons) and/or a benchmark quality of user interaction (e.g., a benchmark screen size such as a benchmark screen size of more than 7.9 inches, which is the screen size of an Apple® iPad® Mini, a benchmark screen resolution, a benchmark processing capability, and/or the like), while the non-limited interaction client devices 102B may enable the benchmark user interaction functionalities and/or the benchmark quality of user interaction. Examples of limited interaction client devices 102A include smartphone devices, table devices, smartwatch devices, and/or the like. Examples of non-limited interaction client devices 102B include personal computer devices. In some embodiments, limited interaction client devices 102A include mobile phones, tablets, and wearables, while non-limited interaction client devices 102B include laptops, laptops, and any device that is configured to output a graphical user interface (GUI) to a monitor.

The document management system 105 may communicate with the client devices 102 using a network 104. The network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the document management system. In some embodiments, the protocol is a custom protocol of JavaScript Object Notation (JSON) objects sent via a Websocket channel. In some embodiments, the protocol is JSON over RPC, JSON over REST/HTTP, and the like.

The document management system 105 may include a document management server 106 and a document object repository 107. The document management server 106 may be configured to detect spatial-temporal states for client devices, determine spatial-temporal relevance scores for document objects given the detected spatial-temporal states for client devices, and generate spatially dynamic document prediction interface based on the spatial-temporal relevance scores. The document management server 106 may be configured to generate push notification user interfaces for document objects whose spatial-temporal relevance score exceeds a critical relevance threshold.

The document object repository 107 may store data associated with one or more document objects associated with the document management system 105. The document object repository 107 may include one or more storage units, such as multiple distributed storage units that are connected through a computer network. Each storage unit in the document object repository 107 may store at least one of one or more data assets and/or one or more data about the computed properties of one or more data assets. Moreover, each storage unit in the document object repository 107 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Document Management Server

Figure 2:
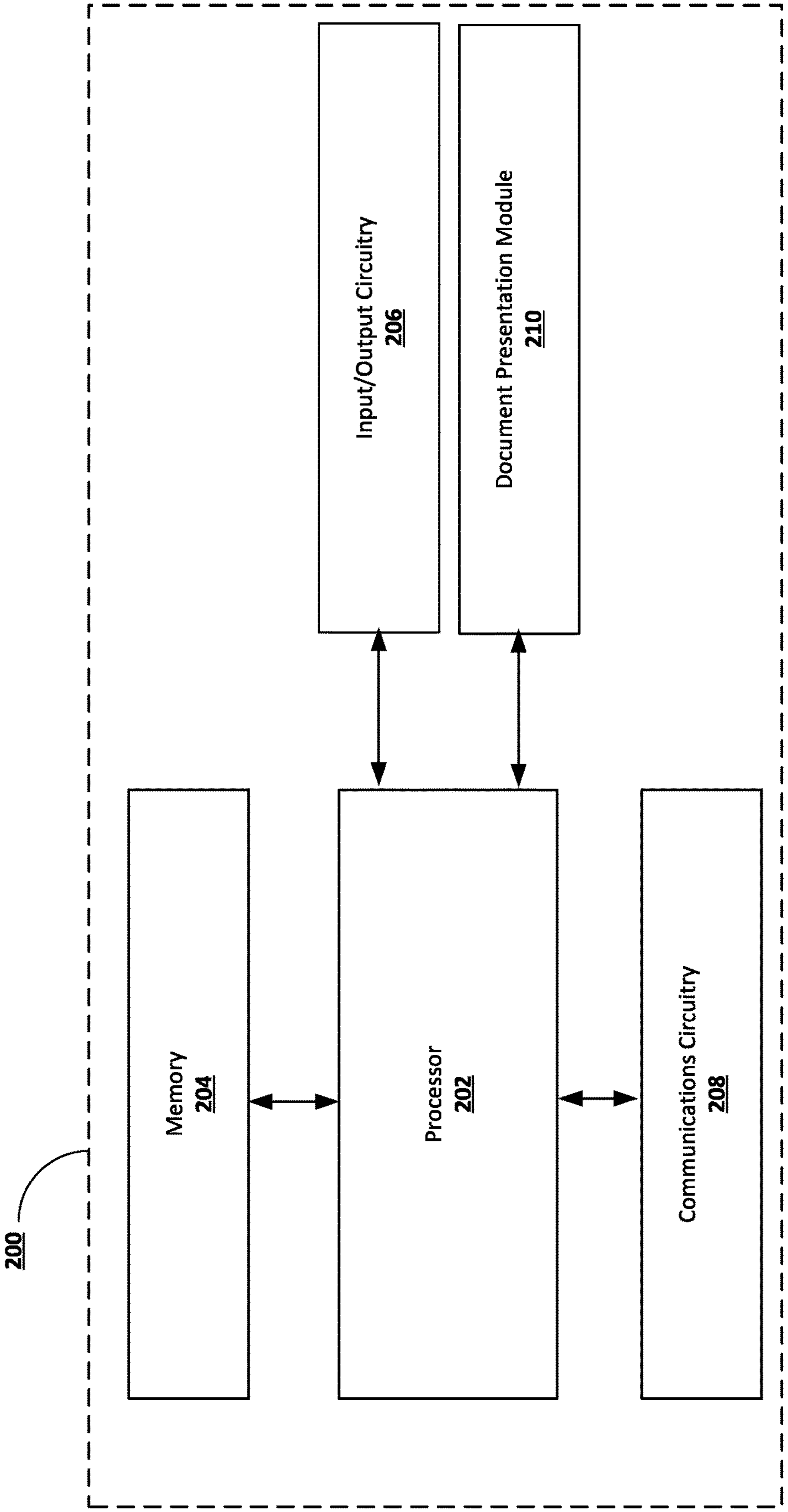
FIG. 2 is a block diagram of an example document management server in accordance with at least some embodiments of the present invention.

The document management server 106 may be embodied by one or more computing systems, such as apparatus 200 shown in FIG. 2. The apparatus 200 may include processor 202, memory 204, input/output circuitry 206, communications circuitry 208, and a document presentation module 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The document presentation module 210 may be any means such as a device or circuitry embodied in either hardware or a combination of hardware and software that is configured to identify whether a client device seeking access to a structured document template object is a limited interaction device and, in response to determining that the client device is a limited interaction device, generate and transmit guided interaction user interface objects corresponding to structured data fields of the structured document template object to the client device. In other embodiments, the document presentation module 210 may be configured to identified whether a client device seeking a structured document template object is operating in a limited interaction device mode (e.g., in tablet mode) and thereby operating as a limited interaction device. In such embodiments, the document presentation module 210 is configured to generate and transmit guided interaction user interface objects corresponding to structured data fields of the structured document template object to the client device.

Subsequent to display of guided interaction user interface objects and receipt of defined-format user inputs in response to the guided interaction user interface objects by a client device, the document presentation module 210 is configured to receive the defined-format user inputs from the client device, generate a structured document template user interface object based on the received defined-format user inputs, and transmit the structured document template user interface object to the client device. The document presentation module 210 may further be configured to process structured document template objects, generate guided interaction configuration objects for the structured document template objects, and store the guided interaction configuration data objects in the memory 204 (e.g., as part of a document repository).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Device

Figure 3:
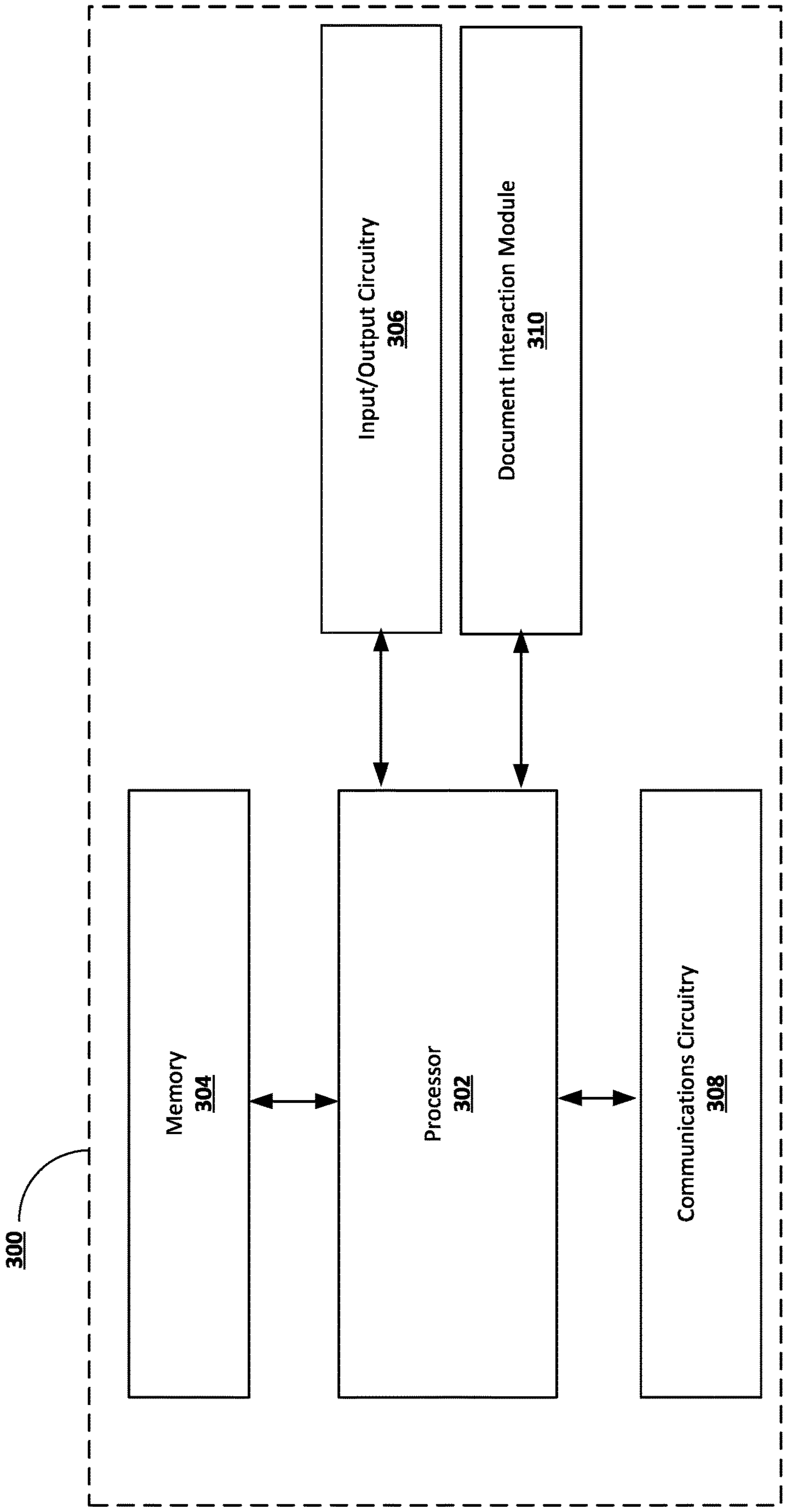
FIG. 3 is a block diagram of an example client device in accordance with at least some embodiments of the present invention.

Referring now to FIG. 3, a client device (e.g., a client device that is a limited interaction device or a client device that is a non-limited interaction device) may be embodied by one or more computing systems, such as apparatus 300 shown in FIG. 3. The apparatus 300 may include processor 302, memory 304, input/output circuitry 306, communications circuitry 308, and a document interaction module 310. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The document interaction module 310 may be any means such as a device or circuitry embodied in either hardware or a combination of hardware and software that is configured to receive guided interaction user interface objects and structured document template user interface objects from the document management server 106 and display guided interaction user interfaces and structured document user interfaces. The document interaction module 310 may further be configured to receive defined-format user inputs that are entered by an end user of the apparatus 300 via interaction with guided interaction user interfaces, and transmit the noted defined-format user inputs to the document management server 106.

In some embodiments, the document interaction module 310 may be configured to determine whether the apparatus 300 is a limited interaction device or a non-limited interaction device, and transmit a data object describing the noted determination to the document management server 106. In some embodiments, the document interaction module 310 may be configured to determine whether a request to access a structured document template object is performed using a limited interaction device mode (e.g., a tablet mode) of the apparatus 300 or a non-limited interaction device mode (e.g., a laptop mode) of the apparatus 300, and transmit a data object describing the noted determination to the document management server 106.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Figure 4:
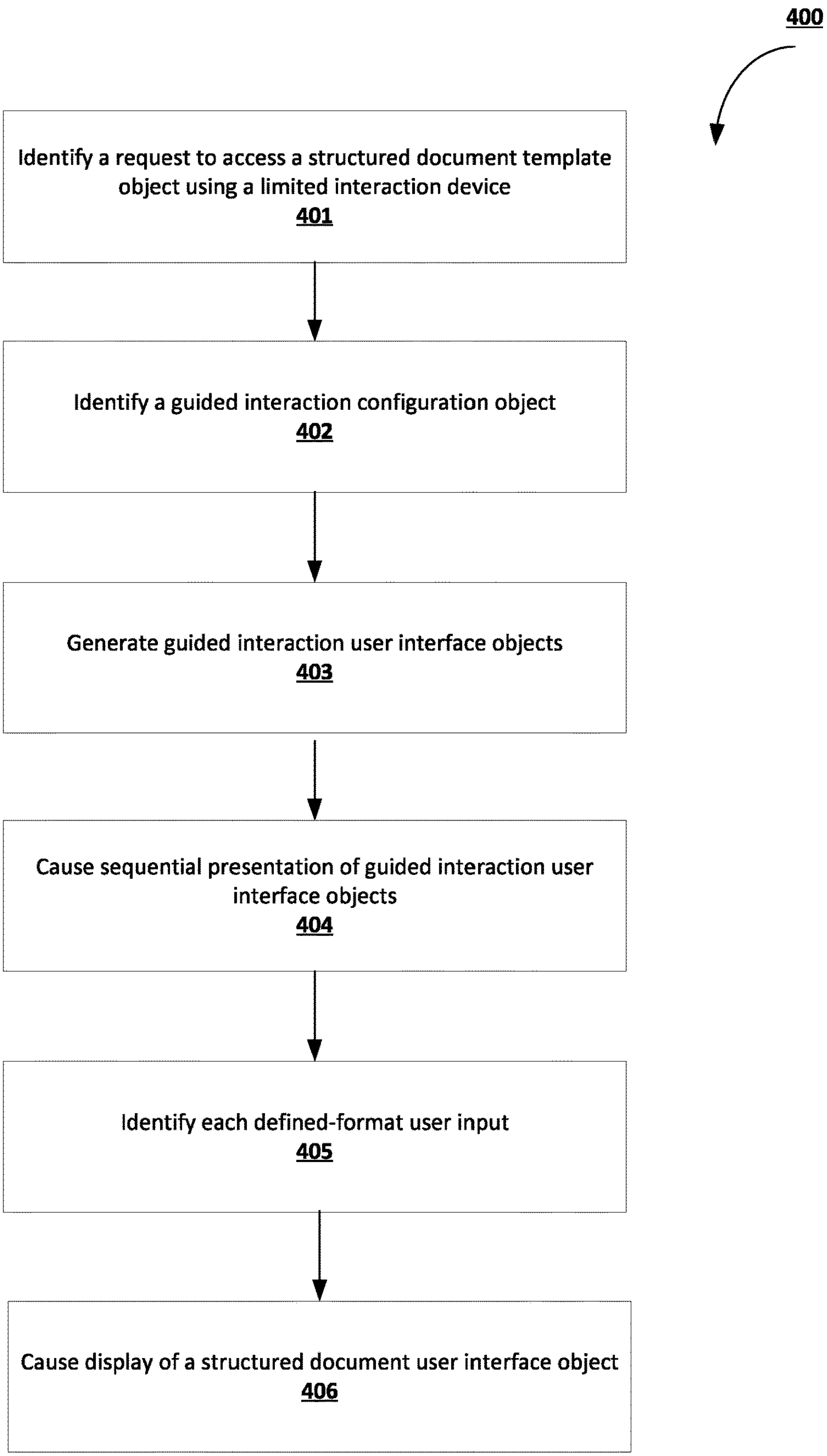
FIG. 4 is a flowchart diagram of an example process for guided interaction with a structured document template object in accordance with at least some embodiments of the present invention.

FIG. 4 is a flowchart diagram of an example process 400 for guided interaction with a structured document template object. Via the various operations of the process 400, the document management server 106 can streamline user interaction with a structured document template object using a limited interaction device, which in turn increases the efficiency and reliability of at least one of the presentation of the structured document template object using the limited interaction device and the receipt of end-user input in response to presentation of the structured document template object using the limited interaction device. In doing so, the document management server 106 can greatly enhance efficiency and reliability of multi-platform document management as well as the versatility and portability of existing document management systems.

The process 400 begins at operation 401 when the document management server 106 identifies a request to access the structured document template object using a limited interaction device. In some embodiments, identifying the request to access includes identifying a limited interaction device and receiving the request to access from the limited interaction device.

In some embodiments, the document management server 106 performs operation 401 when the document management server 106 receives a document access request, where the document access request is configured to access a particular document that is associated with the structured document template object. In some embodiments, the document management server 106 performs operation 401 when the document management server 106 receives a document access request from a limited interaction device, where the document access request is configured to access a particular document that is associated with the structured document template object. In some embodiments, the document management server 106 performs operation 401 when the document management server 106 receives a document access request from a limited interaction user profile of the document management system 105, where the document access request is configured to access a particular document that is associated with the structured document template object. In some embodiments, the document management server 106 performs operation 401 when the document management server 106 receives a document access request, where the document access request is configured to access a particular document that is associated with the structured document template object, and where the structured document template object is associated with a corresponding guided interaction configuration object.

In some embodiments, the limited interaction device is configured to transition between a limited interaction device mode and a non-limited interaction device. In some of the noted embodiments, the document management server 106 is configured to identify that the limited interaction device in response to determining that the limited interaction device is operating in the limited interaction device mode. In some embodiments, the document management server 106 infers whether a client device is a limited interaction device or a non-limited interaction device based on whether the client device seeks to access resources associated with a URL configured to be accessed by limited interaction devices or resources associated with URL configured to be accessed by a non-limited interaction device.

An operational example of a structured document template object 500 is presented in FIG. 5. As depicted in FIG. 5, the structured document template object 500 includes three object segments 511-513. Object segment 511 defines the default text (i.e., "Meeting List") and the metadata attributes for a heading-type structured data field. Object segment 511 further clarifies that the noted heading-type structured data field is associated with a heading per-field structured type 521.

Object segment 512 defines the default text (i.e., "Provided below is the meeting list for Employee") and the metadata attributes for a paragraph-type structured data field. Object segment 512 further clarifies that the noted heading-type structured data field is associated with a paragraph per-field structured type 522.

Object segment 513 defines four structured data fields: (i) a tableRow structured data field which defines the metadata attributes for a table-row-type structured data field and describes that the tableRow structured data field is associated with a table row per-field structured type 523, (ii) a first tableCell structured data field which defines the metadata attributes and the default text (i.e., "Enter Meeting Name") for a first table-cell-type structured data field and further describes that the first tableCell structured data field is associated with a table cell per-field structured data field 524, (iii) a second tableCell structured data field which defines the metadata attributes and the default text (i.e., "Enter Meeting Time") for a second table-cell-type structured data field and further describes that the second tableCell structured data field is associated with the table cell per-field structured data field 524, and (iv) a third tableCell structured data field which defines the metadata attributes and the default text (i.e., "Enter Meeting Address") for a third table-cell-type structured data field and further describes that the third tableCell structured data field is associated with the table cell per-field structured data field 524.

The structured document template object 500 of FIG. 5 can be used to generate a structured document user interface object, which in turn can be used to render the structured document user interface 600 of FIG. 6. The structured document user interface 600 includes: (i) a heading user interface element 611 that is defined by the object segment 511 of the structured document template object 500, (ii) a paragraph user interface element 612 that is defined by the object segment 512 of the structured document template object 500, (iii) a table header row user interface element 613 that is defined by the tableRow structured data field of the object segment 513 of the structured document template object 500, (iv) a first table cell user interface element 621 that is defined by the first tableCell structured data field of the object segment 513 of the structured document template object 500, (v) a second table cell user interface element 622 that is defined by the second tableCell structured data field of the object segment 513 of the structured document template object 500, and (vi) a third table cell user interface element 623 that is defined by the third tableCell structured data field of the object segment 513 of the structured document template object 500.

In some embodiments, a structured document object may describe a document as a collection of structured data fields, where each structured data field is associated with a per-field structured type. For example, a structured document template object may describe that a particular document object is associated with a heading-type structured data field, a paragraph-type structured data field, a group of table-cell-type structured data fields forming a table, and/or the like. In some embodiments, the structured document template object defines a per-document structured format for the document that is associated with the structured document template object. In some embodiments, a structured data field may be a data field defined by a structured document template object that describes a per-field structured type for each defined portion of data that is associated with the structured document template object. Examples of structured data fields include heading-type structured data fields, paragraph-type structured data fields, table-cell-type structured data fields, list-item structured data fields, and/or the like.

In some embodiments, the per-document structured formats defined by a structured document template object collectively define a hierarchy of structured nodes that can be used to define the structured document template object (e.g., a defined hierarchy according to which a table cell node is a child of a table row node, and the table row node is in turn is a child of a table node). In some of the noted embodiments, at least some of the structured data fields correspond to portions of the content data that are associated with the lowest hierarchical levels defined by the noted hierarchy. In some embodiments, a per-field structured type may be a data entity described by a structured data field that describes a mode of presentation of and/or a content type of content data that is associated with a structured data field. For example, a per-field structured type for a corresponding structured data field may describe that the corresponding structured data field is a paragraph, a list item, a table cell, a heading, and/or the like. As another example, a per-field structured type for a corresponding structured data field may describe that the corresponding structured data field is configured to receive an alphanumeric value, a numeric value, a date value, a time value, a date-time value, a phone number value, an email address value, a physical address value, and/or the like.

At operation 402, the document management server 106 identifies a guided interaction configuration object for the structured document template object. In some embodiments, in response to receiving a document access request for a particular document, the document management server 106 retrieves the guided interaction configuration object for the particular document from a document data repository. In some embodiments, in response to receiving a document access request for a particular document from a limited interaction device, the document management server 106 retrieves the guided interaction configuration object for the particular document from a document data repository. In some embodiments, the structured document template object contains a pointer/reference/link to the guided interaction configuration object. In some embodiments, the document associated with the structured document template object contains a pointer/reference/link to the guided interaction configuration object. In some embodiments, both the structured document template object as well as the document associated with the structured document template object contain pointers/references/links to the guided interaction configuration object.

In some embodiments, a guided interaction configuration object is a data object that defines, for each structured data field of a corresponding structured document template object, a guided interaction user interface policy. The guided interaction configuration object may be a structured format file (e.g., a JSON file, an XML file, and/or the like) that is defined based on default guided interaction policies, user-defined guided interaction policies, predictively inferred guided interaction policies, and/or the like. In some embodiments, a guided interaction configuration object may define a common guided interaction policy for a group of structured data fields. For example, a guided interaction configuration object may define a common guided interaction policy for each table-cell-type structured data field that is associated with a common table column of a particular table in the document corresponding to the guided interaction configuration object. In some embodiments, the guided interaction user interface policy describes parameters of a guided interaction user interface object that is generated for a corresponding structured data field of a structured document template object in accordance with the guided interaction user interface policy.

In some embodiments, the guided interaction user interface policy may describe an input mode of a guided interaction user interface object that is generated in accordance with the guided interaction user interface policy. For example, a particular guided interaction user interface policy may define the input mode of a guided interaction user interface object that is configured to receive at least one of an alphanumeric value, a numeric value, a date value, a time value, a date-time value, a phone number value, an email address value, a physical address value, and/or the like. In some embodiments, the guided interaction user interface policy may describe a user interface size, a user interface display time, a user interface color, user interface accessibility settings, and/or the like of a guided interaction user interface object that is generated in accordance with the guided interaction user interface policy. In some embodiments, a guided interaction user interface policy defines a guided interaction type for any structured data fields that are deemed to be associated with the guided interaction user interface policy.

In some embodiments, each guided interaction user interface policy is associated with a guided interaction type, which may be an application-level data type defined by the guided interaction configuration object for a corresponding structured document template object. In some embodiments, a guided interaction type is a data entity described by a guided interaction user interface policy that describes a desired content type of defined-format user input data that is configured to be received in response to a guided interaction user interface object generated in accordance with the guided interaction user interface policy. For example, a guided interaction type may describe that a guided interaction user interface policy is configured to generate guided interaction user interface objects that are in turn configured to receive at least one of an alphanumeric value, a numeric value, a date value, a time value, a date-time value, a phone number value, an email address value, a physical address value, and/or the like. Accordingly, examples of guided interaction types include generic alphanumeric formats, generic numeric formats, date formats, time formats, generic time-date formats, phone number formats, email address formats, physical address formats.

An operational example of a guided interaction configuration object 700 for the structured document template object 500 of FIG. 5 is depicted in FIG. 7. As depicted in FIG. 7, the guided interaction configuration object 700 defines: (i) via object segment 711, that the structured data field defined by the object segment 511 of the structured document template object 500 is associated with a generic text guided interaction type with a maximum size of thirty characters; (ii) via object segment 712, that the structured data field defined by the object segment 511 of the structured document template object 500 is associated with an employee name guided interaction type; (iii) via object segment 713, that the structured data field defined by the encoded tableRow of the object segment 513 of the structured document template object 500 is associated with a guided interaction type defined by a row number value and a column number value; (iv) via object segment 721, that the structured data field of the first table cell user interface element 621 defined by the first encoded tableCell of the object segment 513 of the structured document template object 500 is associated with an unbounded generic text guided interaction type; (v) via object segment 722, that the structured data field defined by the second encoded tableCell of the object segment 513 of the structured document template object 500 is associated with a date-time text guided interaction type with a default value defined by a current date-time; and (vi) via object segment 723, that the structured data field defined by the third encoded tableCell of the object segment 513 of the structured document template object 500 is associated with a physical address text guided interaction.

As described above, a guided interaction user interface policy may be embodied as a data field or array of a guided interaction configuration object that describes properties of a guided interaction user interface object for a corresponding structured data field. For example, as depicted in the guided interaction configuration object 700 of FIG. 7: (i) the guided interaction user interface policy for the structured data field defined by the object segment 511 of the structured document template object 500 is the guided interaction user interface policy 751, which in turn defines a bounded generic text guided interaction type for the noted structured data field, (ii) the guided interaction user interface policy for the structured data field defined by the object segment 512 of the structured document template object 500 is the guided interaction user interface policy 752, which in turn defines an employee name guided interaction type for the noted structured data field, (iii) the guided interaction user interface policy for the tableRow structured data field of the object segment 513 of the structured document template object 500 is the guided interaction user interface policy 753, which in turn defines an integer value pair guided interaction type for the noted structured data field, (iv) the guided interaction user interface policy for the first tableCell structured data field of the object segment 513 of the structured document template object 500 is the guided interaction user interface policy 754 which in turn defines an unbounded text guided interaction type for the noted structured data field, (v) the guided interaction user interface policy for the second tableCell structured data field of the object segment 513 of the structured document template object 500 is the guided interaction user interface policy 755, which in turn defines a date-time guided interaction type for the noted structured data field, and (vi) the guided interaction user interface policy for the third tableCell structured data field of the object segment 513 of the structured document template object 500 is the guided interaction user interface policy 756, which in turn defines an address guided interaction type for the noted structured data field.

As described above, the guided interaction user interface data may be determined based on at least one of user input and predictive data analysis. For example, in some embodiments, each guided interaction type described by a guided interaction user interface policy of the one or more guided interaction user interface policies is defined by an administrator user profile associated with structured document template object via interaction with a document administration user interface object. In some of the noted embodiments, the document administration user interface object is configured to be presented using a non-limited-interaction device. In some embodiments, the document management server 106 provides a document administration user interface object to an administrator computing device (e.g., a non-limited interaction administrator computing device), where the administrator computing device is configured to generate an administrator user interface based on the document administration user interface object, present the administrator user interface, and record the instructions inputted via end-user interaction with the administrator user interface.

An operational example of a document administration user interface 1000 generated based on a document administration user interface object is depicted in FIG. 10. As depicted in FIG. 10, the document administration user interface 1000 enables an administrator user profile to define a guided interaction type for the structured data field 1001. For example, using the document administration user interface 1000, an administrator user profile may describe that the structured data field 1001 is associated with a date guided interaction type.

In some embodiments, the guided interaction user interface data may be determined using unsupervised machine learning techniques. In some of the noted embodiments, determining each guided interaction type described by a guided interaction user interface policy of the one or more guided interaction user interface policies that is associated with a structured data field of the one or more structured data fields comprises mapping field definition data associated with the structured data field to an unsupervised presentation definition machine learning space comprising mappings for a group of training structured data fields, and determining the guided interaction type based on the unsupervised presentation definition machine learning space.

In some embodiments, the training structured input data fields are each associated with a ground-truth guided interaction type, and determining the guided interaction type based on the unsupervised presentation definition machine learning space comprises determining that the structured data field is associated with the ground-truth guided interaction type for a training structured field whose mapping is deemed most proximate to the mapping of the structured data field. In some embodiments, the training structured input data fields are each associated with a ground-truth guided interaction type, and determining the guided interaction type based on the unsupervised presentation definition machine learning space comprises determining that the structured data field is associated with the dominant ground-truth guided interaction type for a subset of the training structured fields whose mappings are within a proximity threshold of the mapping of the structured data field.

In some embodiments, performing mapping of field definition data associated with the structured data field to the unsupervised presentation definition machine learning space is performed based on one or more mapping attributes of the unsupervised presentation definition machine learning space. Examples of mapping attributes of an unsupervised presentation definition machine learning space include the vector representation (e.g., Word2Vec representation) of the text description of a structured data field, a normalized coordinate location descriptor of a user interface element corresponding to the structured data field within a document to which the structured data field belongs, and/or the like.

In some embodiments, the guided interaction user interface objects may be determined using supervised machine learning techniques. In some embodiments, determining each guided interaction type described by a guided interaction user interface policy of the one or more guided interaction user interface policies that is associated with a structured data field of the one or more structured data fields comprises processing field definition data associated with the structured data field using a trained supervised presentation definition machine learning model in order to generate the guided interaction type. In some embodiments, the trained supervised presentation definition machine learning model that is trained using ground-truth guided interaction types for a group of training structured data fields. In some embodiments, the trained supervised presentation definition machine learning model is a neural network model that is configured to receive defined inputs for each structured data field in order to determine a guided interaction type and/or a guided interaction priority for the structured data field, where the guided interaction priority for a structured data field may be used to determine a position of a guided interaction user interface object for the structured data field in a guided interaction presentation order. In some embodiments, inputs to a trained supervised presentation definition machine learning model include vector representation (e.g., Word2Vec representation) of the text description of a structured data field, a normalized coordinate location descriptor of a user interface element corresponding to the structured data field within a document to which the structured data field belongs, and/or the like. In some embodiments, the trained supervised presentation definition machine learning model is trained using gradient descent with backpropagation.

At operation 503, the document management server 106 generates one or more guided interaction user interface objects, where each guided interaction user interface object of the one or more guided interaction user interface objects is associated with a corresponding structured data field of the one or more structured data fields. In some embodiments, a guided interaction user interface object that is associated with a particular structured data field is generated based on the guided interaction user interface policy for the particular structured data field. In some embodiments, a guided interaction user interface object that is associated with a particular structured data field is configured to receive a defined-format user input that is associated with the particular structured data field. As one example, as depicted in FIG. 8E, the guided interaction user interface is configured to receive the defined-format user input describing Dec. 12, 2013 at 10:49 AM.

In some embodiments, a guided interaction user interface object is a data object that describes the user interface data associated with a guided interaction user interface that is generated for a corresponding structured data field of a structured document template object in accordance with a corresponding guided interaction user interface policy. For example, a guided interaction user interface object may describe HTML data associated with a guided interaction user interface object that is generated for a corresponding structured data field of a structured document template object in accordance with a corresponding guided interaction user interface policy. The guided interaction user interface object may be configured to be transmitted to a limited-interaction device in order to be enable rendering of the corresponding guided interaction user interface that is associated with the guided interaction user interface object by the limited-interaction device.

Figure 8A:
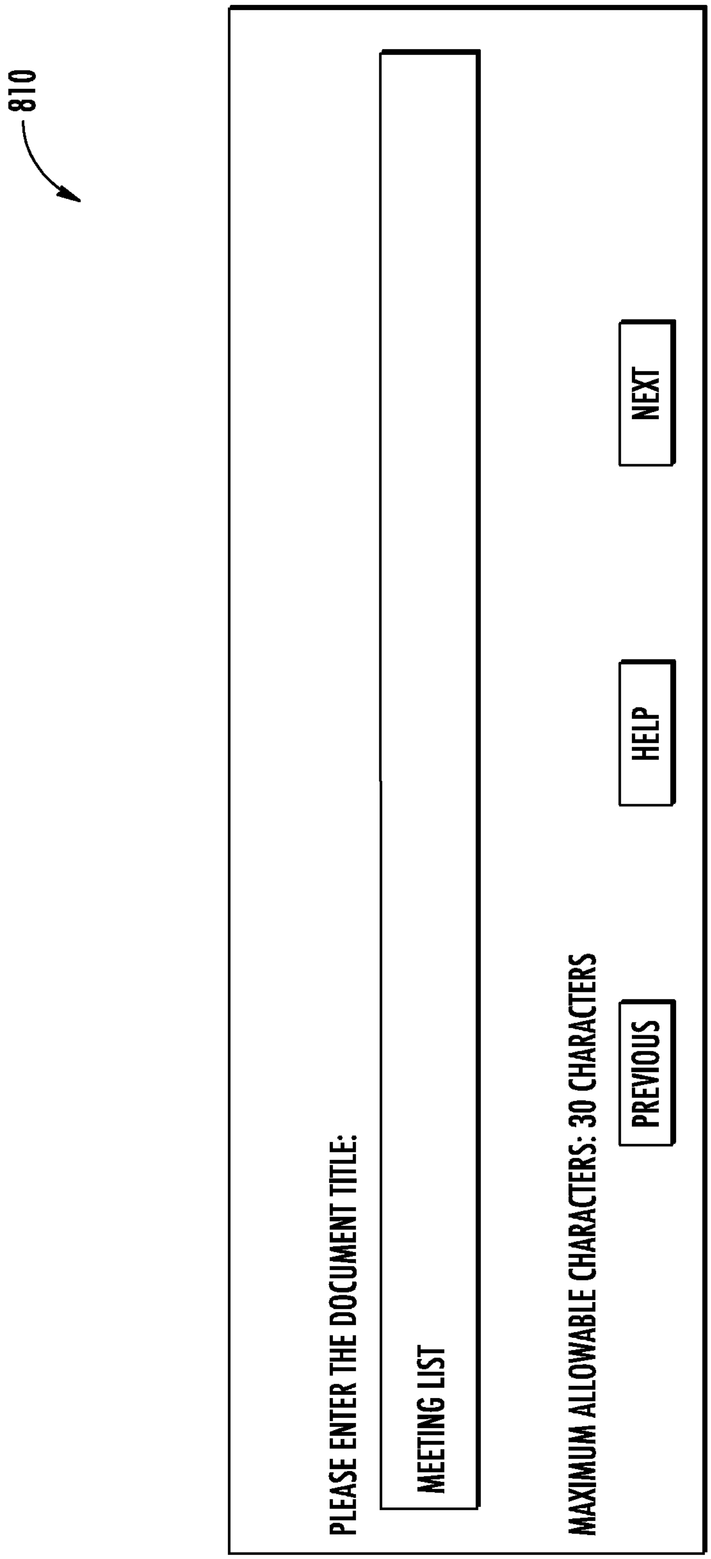
Figure 8B:
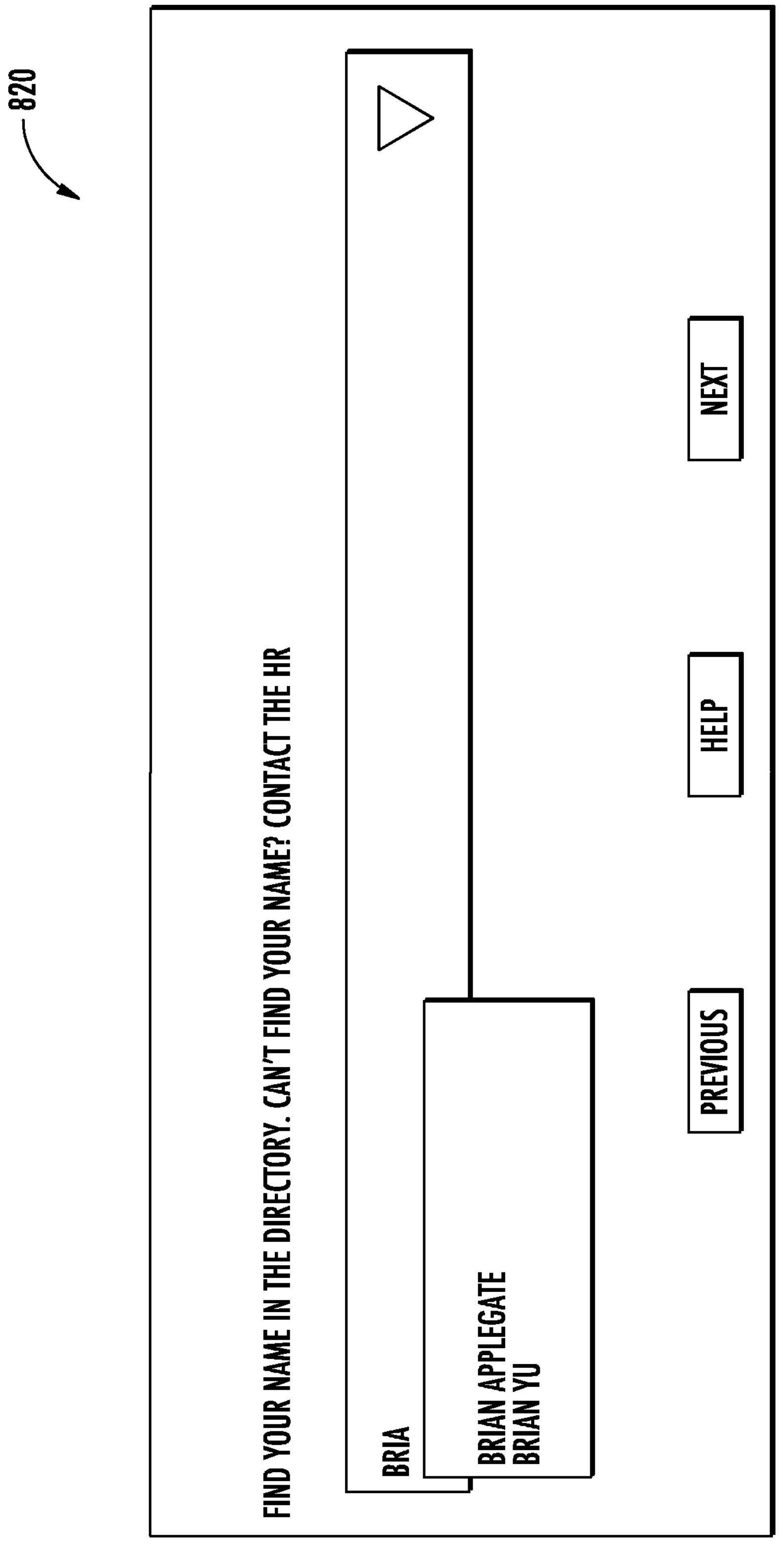
Figure 8C:
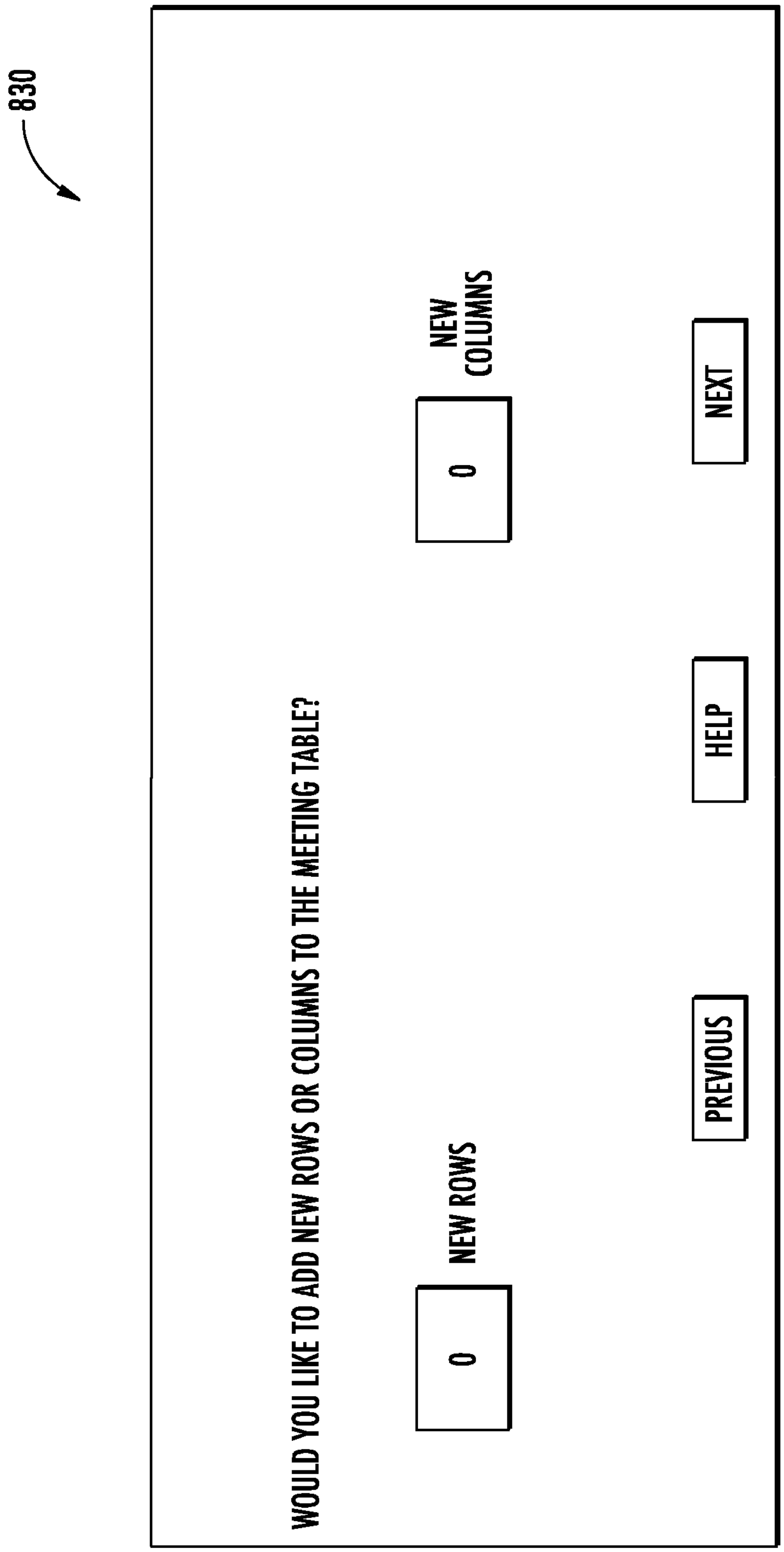
Figure 8D:
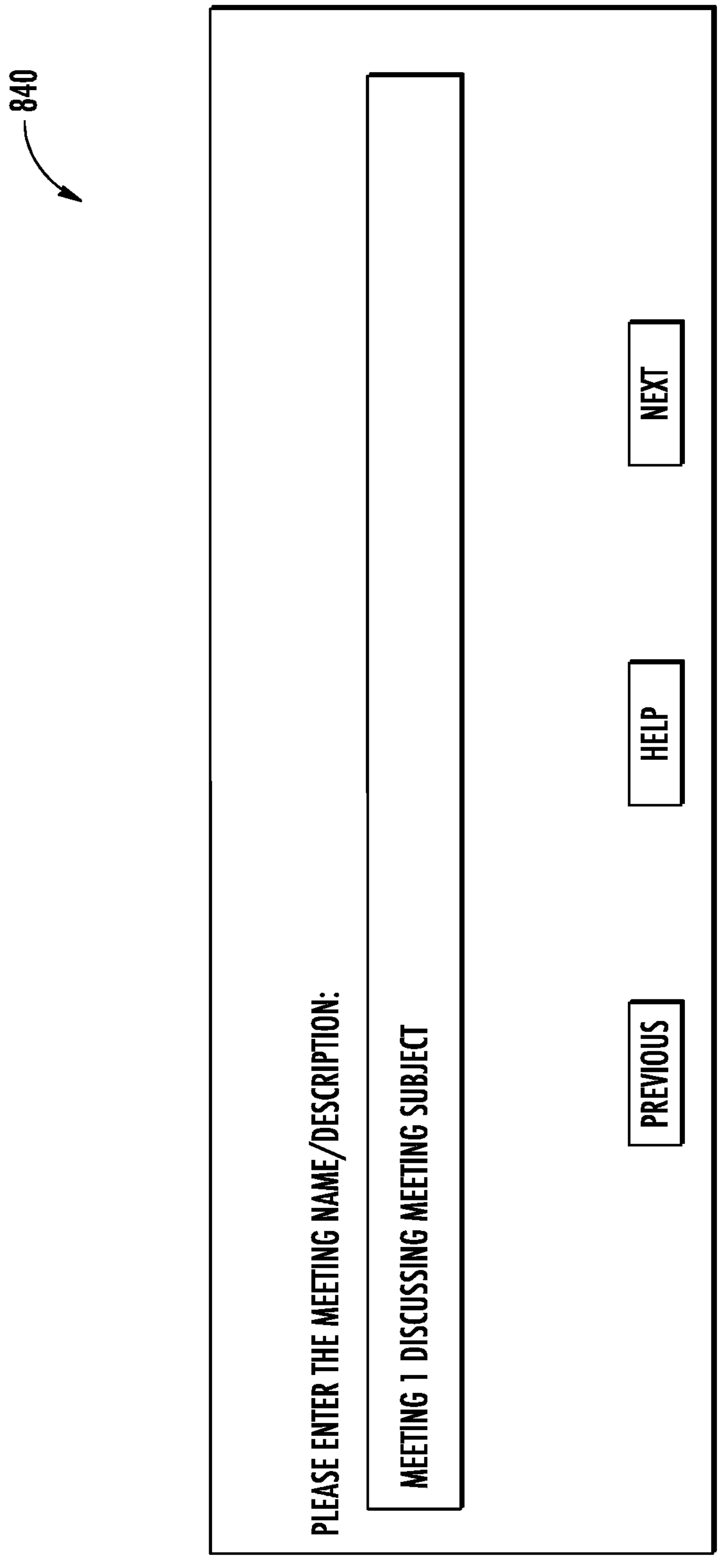
Figure 8E:
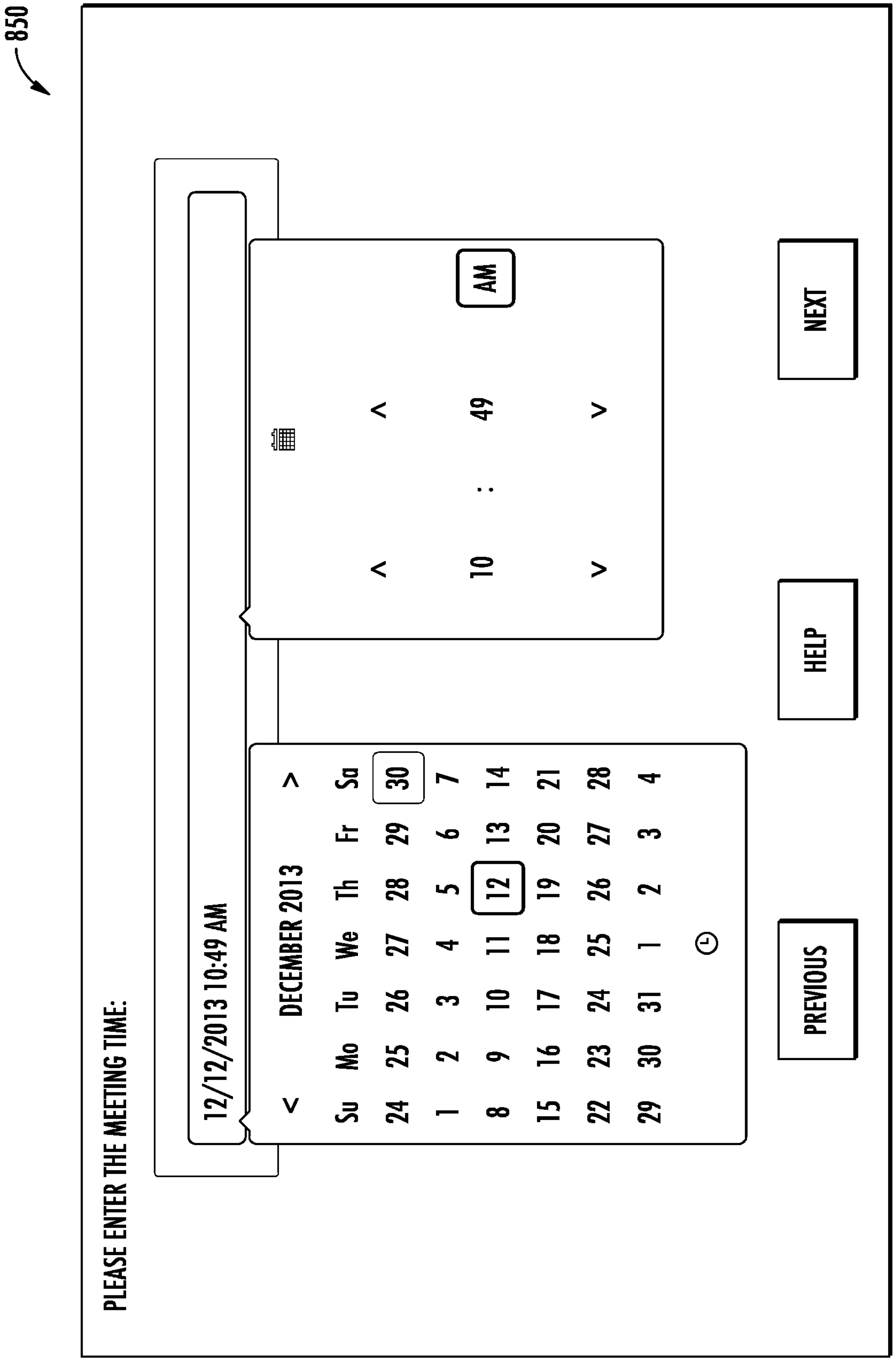
Figure 8F:
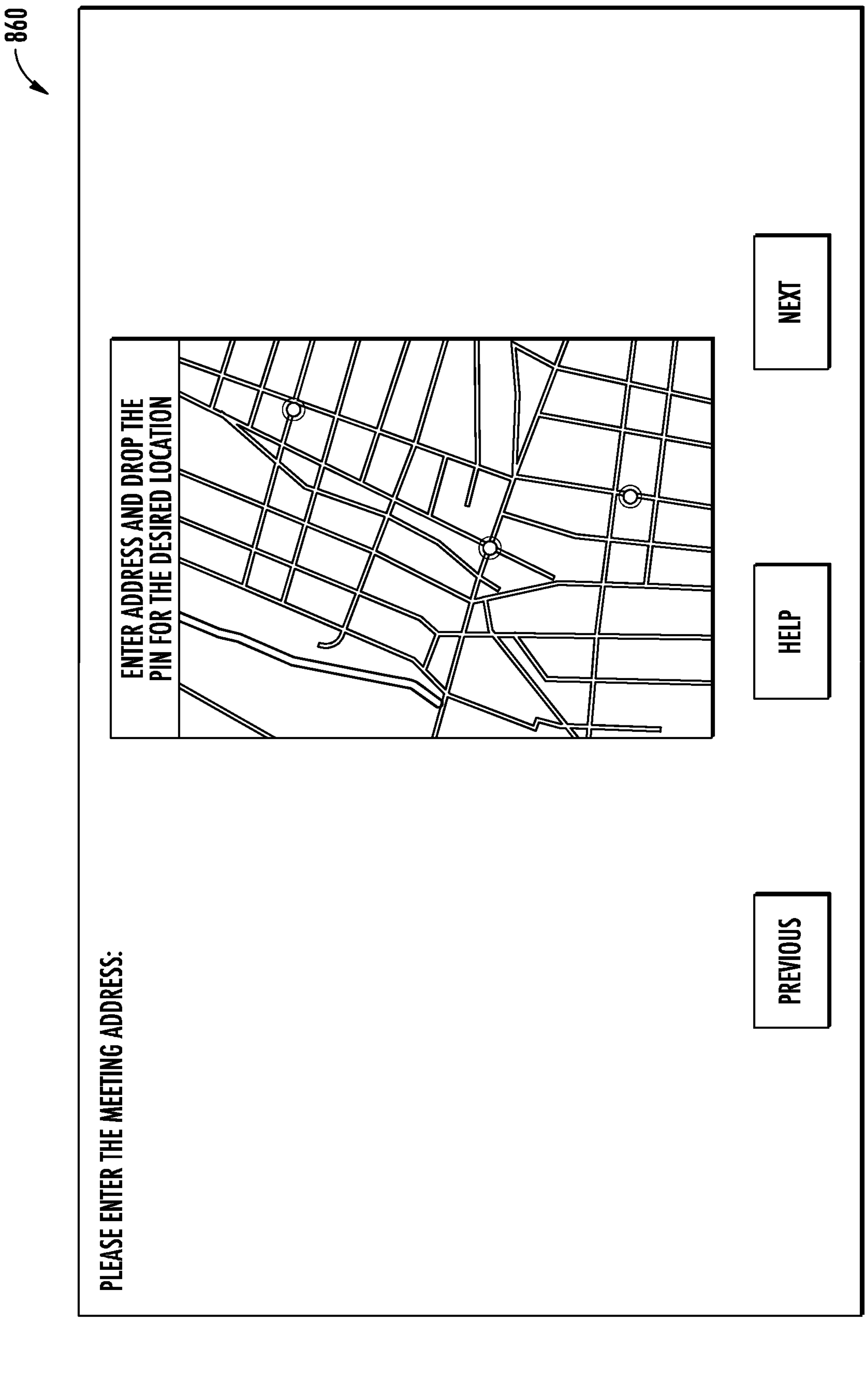

Operational examples of various guided interaction user interfaces that may be generated in accordance with corresponding guided interaction user interface objects are depicted in FIGS. 8A-8F. In particular, the guided interaction user interface 810 that is depicted in FIG. 8A has been generated in accordance with the object segment 711 of the guided interaction configuration object 700 of FIG. 7, is associated with the structured data field that corresponds to the heading user interface element 611 of the structured document user interface 600 of FIG. 6, and is configured to receive a defined-format user input that is a text input with less than thirty characters (e.g., the defined-format user input "Meeting List for John Smith"). Also, the guided interaction user interface 820 that is depicted in FIG. 8B has been generated in accordance with the object segment 712 of the guided interaction configuration object 700 of FIG. 7, is associated with the structured data field of the paragraph user interface element 612 of the structured document user interface 600 of FIG. 6, and is configured to receive a defined-format user input that is an employee name from an employee directory (e.g., the defined-format user input that describes employee John Smith).

The guided interaction user interface 830 that is depicted in FIG. 8C has been generated in accordance with the object segment 713 of the guided interaction configuration object 700 of FIG. 7, is associated with the structured data field of the table header row user interface element 613 of the structured document user interface 600 of FIG. 6, and is configured to receive a defined-format user input that describes a desired number of additional rows and a desired number of additional columns (e.g., the defined-format user input that describes two rows and three columns). Furthermore, the guided interaction user interface 840 that is depicted in FIG. 8D has been generated in accordance with the object segment 721 of the guided interaction configuration object 700 of FIG. 7, is associated with the structured data field of the first table cell user interface element 621 of the structured document user interface 600 of FIG. 6, and is configured to receive a defined-format user input that is an unbounded text (e.g., the defined-format user input "Sales Meeting"). Moreover, the guided interaction user interface 850 that is depicted in FIG. 8E has been generated in accordance with the object segment 722 of the guided interaction configuration object 700 of FIG. 7, is associated with the structured data field of the second table cell user interface element 622 of the structured document user interface 600 of FIG. 6, and is configured to receive a defined-format user input that is a date-time value (e.g., the defined-format user input that describes Dec. 12, 2013 at 10:49 AM). Finally, the guided interaction user interface 860 that is depicted in FIG. 8E has been generated in accordance with the object segment 723 of the guided interaction configuration object 700 of FIG. 7, is associated with the structured data field of the third table cell user interface element 623 of the structured document user interface 600 of FIG. 6, and is configured to receive a defined-format user input that describes a physical address value (e.g., the defined-format user input describing 123 ABC Street, Atlanta Ga. 30360).

At operation 504, the document management server 106 causes sequential presentation of the guided interaction user interface objects on a limited interaction device. In some embodiments, the document management server 106 transmits the guided interaction user interface objects to the limited interaction device and causes the limited interaction device to display guided interaction user interfaces that correspond to the guided interaction user interface objects (e.g., guided interaction user interfaces depicted in FIGS. 8A-8F). In some embodiments, the document management server 106 transmits the guided interaction user interface objects to a client-side application that is executing on the limited interaction device and causes the client-side application executing on the limited interaction device to display guided interaction user interfaces user interface objects (e.g., guided interaction user interfaces depicted in FIGS. 8A-8F).

In some embodiments, the document management server 106 causes the limited-interaction device to sequentially present the one or more guided interaction user interface objects according to a guided interaction presentation order. A guided interaction presentation order may describe a desired order of successive presentation of guided interaction user interface objects that are generated for structured data fields defined by a structured template document object. For example, given a structured template data object that is associated with structured data fields SDF1-SDF4, the guided interaction presentation order for the noted structured data fields may require that the following operations be performed: (i) first, the guided interaction user interface object for the structured data field SDF2 be displayed; (ii) after the end-user indicates a desire to transition from the guided interaction user interface object for the structured data field SDF2, the guided interaction user interface object for the structured data field SDF3 be displayed; (iii) after the end-user indicates a desire to transition from the guided interaction user interface object for the structured data field SDF3, the guided interaction user interface object for the structured data field SDF1 be displayed; and (iv) after the end-user indicates a desire to transition from the guided interaction user interface object for the structured data field SDF1, the guided interaction user interface object for the structured data field SDF4 be displayed.

In some embodiments, the structured document template object defines a layout format for the one or more structured data fields, and the guided interaction presentation order is determined based on the layout format. For example, in accordance with the structured document template object 500 of FIG. 5 which is associated with a sequential layout format, the guided interaction user interface objects that correspond to object segment 711 may be displayed prior to the guided interaction user interface objects that correspond to object segment 712, and the guided interaction user interface objects that correspond to object segment 712 may be displayed prior to the guided interaction user interface objects that correspond to the object segment 713. As another example, in accordance with the structured document template object 500 of FIG. 5, the guided interaction user interface objects that correspond to the encoded tableRow structured data field of the object segment 513 may be displayed before or after the guided interaction user interface objects that correspond to the encoded tableCell structured data fields of the object segment 513. As yet another example, the guided interaction user interface objects that correspond to the first encoded tableCell structured data field of the object segment 513 may be displayed prior to the guided interaction user interface objects that correspond to the second encoded tableCell structured data field of the object segment 513, and the guided interaction user interface objects that correspond to the second encoded tableCell structured data field of the object segment 513 may be displayed prior to the guided interaction user interface objects that correspond to third encoded tableCell structured data field of the object segment 513.

In some embodiments, the guided interaction presentation order is defined by the guided interaction configuration object. In some embodiments, the structured document template object is a structured format file (e.g., a JavaScript Object Notation (JSON) file) having an encoding order, and the layout format is determined based on the encoding order of the structured format file.

At operation 505, the document management server 106 identifies the defined-format user inputs received in response to the guided interaction user interface objects. In some embodiments, subsequent to each sequential presentation of a guided interaction user interface object of the one or more guided interaction user interface objects, the document management server 106 identifies the defined-format user input received by the guided interaction user interface object. In some embodiments, subsequent to each sequential presentation of a guided interaction user interface object of the one or more guided interaction user interface objects on the limited interaction device, the document management server 106 receives the defined-format user input received by the guided interaction user interface object from the limited interaction device.

At operation 506, the document management server 106 causes display of a structured document user interface object. In some embodiments, subsequent to sequential presentation of all of the one or more guided interaction user interface objects, the document management server 106 generates a structured document user interface object by mapping each identified defined-format user input to the structured data field that is associated with the identified defined-format user input, and causes the limited-interaction device to present the structured document user interface object. In some embodiments, to generate the structured document user interface object, the document management server 106 integrates (i.e., adds) the defined-format user inputs received in response to the guided interaction user interface objects to the structured document template object, where the integration of the defined-format user inputs may be performed in accordance with a document-wide structured format of the structured document template object.

In some embodiments, a structured document user interface object describes the user interface data associated with a corresponding structured document user interface that is configured to display the structured data fields associated with a structured document template object. For example, a structured document user interface object may describe HTML data associated with a particular document whose per-document structured format is defined by the corresponding structured document user interface. The structured document user interface object may be configured to be transmitted to an end-user computing device (which may be a limited-interaction device) in order to be enable rendering of the corresponding structured document user interface that is associated with the structured document user interface object by the end-user computing device. In some embodiments, the structured document user interface object for a corresponding structured document template object may be generated by integrating defined-format user inputs generated in response to guided interaction user interface objects that are associated with the structured data fields of the corresponding structured document template object into the corresponding structured document template object. In some of the noted embodiments, a defined-format user input may describe a collection of user-entered data that is configured to be received by end-user interaction with a guided interaction user interface that is rendered based on a guided interaction user interface object, where at least one aspect of a desired format of the collection of user-entered data is defined based on a desired input format of the corresponding guided interaction user interface object. Examples of defined-format user inputs include a collection of user-entered data that is expected to describe an alphanumeric value, a collection of user-entered data that is expected to describe a numeric value, a collection of user-entered data that is expected to describe a date value, a collection of user-entered data that is expected to describe a time value, a collection of user-entered data that is expected to describe a date-time value, a collection of user-entered data that is expected to describe a phone number value, a collection of user-entered data that is expected to describe an email address value, a collection of user-entered data that is expected to describe a physical address value, and/or the like.

An operational example of a structured document user interface object 900 generated by integrating user input data is depicted in FIG. 9. As depicted in FIG. 9, the structured document user interface objects includes: (i) a user interface element 911 determined based on the defined-format user input supplied by an end-user to the guided interaction user interface 810 of FIG. 8A, (ii) a user interface element 912 determined based on the defined-format user input supplied by an end-user to the guided interaction user interface 820 of FIG. 8B, (i) a user interface element 913 (i.e., a table user interface element) determined based on the defined-format user input supplied by an end-user to the guided interaction user interface 830 of FIG. 8C, (iv) a user interface element 921 determined based on the defined-format user input supplied by an end-user to the guided interaction user interface 840 of FIG. 8D, (v) a user interface element 922 determined based on the defined-format user input supplied by an end-user to the guided interaction user interface 850 of FIG. 8D, and (iv) a user interface element 923 determined based on the defined-format user input supplied by an end-user to the guided interaction user interface 860 of FIG. 8F.

While various embodiments of the present invention describe displaying guided interaction user interfaces and/or structured document user interfaces on limited interaction devices, a person of ordinary skill in the relevant technology will recognize that the innovative concepts of the present invention can be utilized to cause display of guided interaction user interfaces and/or structured document user interfaces on non-limited-interaction devices as well as limited interaction devices.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for guided interaction with a structured document template object defining one or more structured data fields on a limited-interaction device, the apparatus comprising at least one processor and at least one memory including program code, the at least one memory and the program code configured to, with the processor, cause the apparatus to at least:

identify a guided interaction configuration object for the structured document template object, wherein the guided interaction configuration object defines a guided interaction user interface policy of one or more guided interaction user interface policies for each structured data field of the one or more structured data fields, and wherein each structured data field is associated with a defined format, and further wherein the guided interaction user interface policy for a particular structured data field defines one or more presentation parameters of a user interface that is configured to enable a user to enter data having the defined format of the particular structured data field into the particular structured data field;

generate one or more guided interaction user interface objects, wherein each guided interaction user interface object of the one or more guided interaction user interface objects is associated with a corresponding structured data field of the one or more structured data fields, is generated based on the one or more presentation parameters defined by the guided interaction user interface policy for the corresponding structured data field, and is configured to receive a defined-format user input having the defined format of the corresponding structured data field;

cause the limited-interaction device to sequentially present the one or more guided interaction user interface objects according to a guided interaction presentation order;

subsequent to each sequential presentation of a guided interaction user interface object of the one or more guided interaction user interface objects, identify the defined-format user input received by the guided interaction user interface object; and subsequent to sequential presentation of all of the one or more guided interaction user interface objects, generate a structured document user interface object by mapping each identified defined-format user input to the structured data field that is associated with the identified defined-format user input, and cause the limited-interaction device to present the structured document user interface object.

2. The apparatus of claim 1, wherein:

the structured document template object defines a per-field structured type for each structured data field of the one or more structured data fields, and each defined-format user input that is configured to be received by a guided interaction user interface object of the one or more guided interaction user interface objects is associated with a guided interaction type that is determined based on the per-field structured type of the structured data field that corresponds to the guided interaction user interface object.

3. The apparatus of claim 1, wherein:

each defined-format user input that is configured to be received by a guided interaction user interface object is associated with a guided interaction type, and each guided interaction type for a defined-format user input that is configured to be received by the one or more guided interaction user interface objects is determined based on the guided interaction user interface policy that is used to generate the guided interaction user interface object.

4. The apparatus of claim 3, wherein each guided interaction type described by the one or more guided interaction user interface policies is defined by an administrator user profile associated with structured document template object via interaction with a document administration user interface object.

5. The apparatus of claim 4, wherein the document administration user interface object is configured to be presented using a non-limited-interaction device.

6. The apparatus of claim 3, wherein determining each guided interaction type described by a guided interaction user interface policy of the one or more guided interaction user interface policies that is associated with a structured data field of the one or more structured data fields comprises:

processing field definition data associated with the structured data field using a trained supervised presentation definition machine learning model in order to generate the guided interaction type.

7. The apparatus of claim 6, wherein the trained supervised presentation definition machine learning model that is trained using ground-truth guided interaction types for a group of training structured data fields.

8. The apparatus of claim 3, wherein determining each guided interaction type described by a guided interaction user interface policy of the one or more guided interaction user interface policies that is associated with a structured data field of the one or more structured data fields comprises:

mapping field definition data associated with the structured data field to an unsupervised presentation definition machine learning space comprising mappings for a group of training structured data fields, and determining the guided interaction type based on the unsupervised presentation definition machine learning space.

9. The apparatus of claim 1, wherein:

the structured document template object defines a layout format for the one or more structured data fields, and the guided interaction presentation order is determined based on the layout format.

10. The apparatus of claim 9, wherein:

the structured document template object is a structured format file having an encoding order, and the layout format is determined based on the encoding order of the structured format file.

11. The apparatus of claim 1, wherein:

the limited interaction device is configured to transition between a limited interaction device mode and a non-limited interaction device mode, and the apparatus is configured to identify the limited interaction device in response to determining that the limited interaction device is operating in the limited interaction device mode.

12. A computer-implemented method for guided interaction with a structured document template object defining one or more structured data fields on a limited-interaction device, the computer-implemented method comprising:

identifying a guided interaction configuration object for the structured document template object, wherein the guided interaction configuration object defines a guided interaction user interface policy of one or more guided interaction user interface policies for each structured data field of the one or more structured data fields, and wherein each structured data field is associated with a defined format, and further wherein the guided interaction user interface policy for a particular structured data field defines one or more presentation parameters of a user interface that is configured to enable a user to enter data having the defined format of the particular structured data field into the particular structured data field;

generating one or more guided interaction user interface objects, wherein each guided interaction user interface object of the one or more guided interaction user interface objects is associated with a corresponding structured data field of the one or more structured data fields, is generated based on the one or more presentation parameters defined by the guided interaction user interface policy for the corresponding structured data field, and is configured to receive a defined-format user input having the defined format of the corresponding structured data field;

causing the limited-interaction device to sequentially present the one or more guided interaction user interface objects according to a guided interaction presentation order;

subsequent to each sequential presentation of a guided interaction user interface object of the one or more guided interaction user interface objects, identifying the defined-format user input received by the guided interaction user interface object; and subsequent to sequential presentation of all of the one or more guided interaction user interface objects, generating a structured document user interface object by mapping each identified defined-format user input to the structured data field that is associated with the identified defined-format user input, and causing the limited-interaction device to present the structured document user interface object.

13. The computer-implemented method of claim 12, wherein:

each defined-format user input that is configured to be received by a guided interaction user interface object of the one or more guided interaction user interface objects is associated with a guided interaction type, and each guided interaction type for a defined-format user input that is configured to be received by a guided interaction user interface object of the one or more guided interaction user interface objects is determined based on the guided interaction user interface policy that is used to generate the guided interaction user interface object.

14. The computer-implemented method of claim 12, wherein:

each defined-format user input that is configured to be received by the one or more guided interaction user interface objects is associated with a guided interaction type, and each guided interaction type for a defined-format user input that is configured to be received by the one or more guided interaction user interface objects is determined based on the guided interaction user interface policy that is used to generate the guided interaction user interface object.

15. The computer-implemented method of claim 14, wherein each guided interaction type described by the one or more guided interaction user interface policies is defined by an administrator user profile associated with structured document template object via interaction with a document administration user interface object.

16. The computer-implemented method of claim 14, wherein determining each guided interaction type described by a guided interaction user interface policy of the one or more guided interaction user interface policies that is associated with a structured data field of the one or more structured data fields comprises:

processing field definition data associated with the structured data field using a trained supervised presentation definition machine learning model in order to generate the guided interaction type.

17. The computer-implemented method of claim 14, wherein determining each guided interaction type described by a guided interaction user interface policy of the one or more guided interaction user interface policies that is associated with a structured data field of the one or more structured data fields comprises:

mapping field definition data associated with the structured data field to an unsupervised presentation definition machine learning space comprising mappings for a group of training structured data fields, and determining the guided interaction type based on the unsupervised presentation definition machine learning space.

18. A computer program product for guided interaction with a structured document template object defining one or more structured data fields on a limited-interaction device, the computer program product comprising at least one non-transitory computer-readable storage medium having computer-readable program code portions stored therein, the computer-readable program code portions configured to:

identify a guided interaction configuration object for the structured document template object, wherein the guided interaction configuration object defines a guided interaction user interface policy of one or more guided interaction user interface policies for each structured data field of the one or more structured data fields, and wherein each structured data field is associated with a defined format, and further wherein the guided interaction user interface policy for a particular structured data field defines one or more presentation parameters of a user interface that is configured to enable a user to enter data having the defined format of the particular structured data field into the particular structured data field;

generate one or more guided interaction user interface objects, wherein each guided interaction user interface object of the one or more guided interaction user interface objects is associated with a corresponding structured data field of the one or more structured data fields, is generated based on the one or more presentation parameters defined by the guided interaction user interface policy for the corresponding structured data field, and is configured to receive a defined-format user input having the defined format of the corresponding structured data field;

cause the limited-interaction device to sequentially present the one or more guided interaction user interface objects according to a guided interaction presentation order;

subsequent to each sequential presentation of a guided interaction user interface object of the one or more guided interaction user interface objects, identify the defined-format user input received by the guided interaction user interface object; and subsequent to sequential presentation of all of the one or more guided interaction user interface objects, generate a structured document user interface object by mapping each identified defined-format user input to the structured data field that is associated with the identified defined-format user input, and cause the limited-interaction device to present the structured document user interface object.

19. The computer program product of claim 18, wherein:

each defined-format user input that is configured to be received by the one or more guided interaction user interface objects is associated with a guided interaction type, and each guided interaction type for a defined-format user input that is configured to be received by the one or more guided interaction user interface objects is determined based on the guided interaction user interface policy that is used to generate the guided interaction user interface object.

20. The computer program product of claim 19, wherein determining each guided interaction type described by a guided interaction user interface policy of the one or more guided interaction user interface policies that is associated with a structured data field of the one or more structured data fields comprises:

mapping field definition data associated with the structured data field to an unsupervised presentation definition machine learning space comprising mappings for a group of training structured data fields, and determining the guided interaction type based on the unsupervised presentation definition machine learning space.

21. An apparatus for guided interaction with a structured document template object defining one or more structured data fields, the apparatus comprising at least one processor and at least one memory including program code, the at least one memory and the program code configured to, with the processor, cause the apparatus to at least:

identify a request to access a structured document template object;

transmit the request to access to a document management server;

in response to transmitting the request to access to the document management server, receiving, from the document management server, one or more guided interaction user interface objects, wherein each guided interaction user interface object of the one or more guided interaction user interface objects: (i) is associated with a corresponding structured data field of the one or more structured data fields, (ii) is generated based on one or more presentation parameters defined by the guided interaction user interface policy for the corresponding structured data field, and (iii) is configured to receive a defined-format user input having a defined format of the corresponding structured data field, and wherein each structured data field is associated with a corresponding defined format, and further wherein the guided interaction user interface policy for a particular structured data field defines the one or more presentation parameters of a user interface that is configured to enable a user to enter data having the defined format of the particular structured data field into the particular structured data field;

sequentially present the one or more guided interaction user interface objects according to a guided interaction presentation order;

subsequent to each sequential presentation of a guided interaction user interface object of the one or more guided interaction user interface objects:

identify the defined-format user input received by the guided interaction user interface object, and transmit the defined-format user input to the document management server; and subsequent to sequential presentation of all of the one or more guided interaction user interface objects:

receive, from the document management server, a structured document user interface object, wherein the structured document user interface object is configured to map each identified defined-format user input to the structured data field that is associated with the identified defined-format user input, and present the structured document user interface object.

22. The apparatus of claim 21, wherein:

the structured document template object defines a per-field structured type for each structured data field of the one or more structured data fields, and each defined-format user input that is configured to be received by a guided interaction user interface object of the one or more guided interaction user interface objects is associated with a guided interaction type that is determined based on the per-field structured type of the structured data field that corresponds to the guided interaction user interface object.

23. The apparatus of claim 21, wherein:

each defined-format user input that is configured to be received by a guided interaction user interface object of the one or more guided interaction user interface objects is associated with a guided interaction type, and each guided interaction type for a defined-format user input that is configured to be received by a guided interaction user interface object of the one or more guided interaction user interface objects is determined based on a guided interaction user interface policy that is used to generate the guided interaction user interface object.

24. The apparatus of claim 21, wherein:

the apparatus is configured to transition between a limited interaction device mode and a non-limited interaction device mode, and identifying the request to access comprises identifying that the apparatus is operating in the limited interaction device mode.

* * * * *